United States Patent
Einav et al.

(10) Patent No.: US 11,331,847 B2
(45) Date of Patent: May 17, 2022

(54) ADDITIVE MANUFACTURING USING POLYMER MATERIALS

(71) Applicant: LARGIX TECH LTD., Tzur Yigal (IL)

(72) Inventors: Omer Einav, Kfar Monash (IL); Doron Shabanov, Zur-Yigal (IL); Amir Sheelo, Ra'anana (IL); Ronen Orr, Tel Mond (IL); Hassdi Matarasso, Pardes Hana (IL); Shmuel Rosenmann, Jerusalem (IL)

(73) Assignee: LARGIX TECH LTD., Tzur Yigal (IL)

( * ) Notice: Subject to any disclaimer, the term of this patent is extended or adjusted under 35 U.S.C. 154(b) by 595 days.

(21) Appl. No.: 15/939,325

(22) Filed: Mar. 29, 2018

(65) Prior Publication Data

US 2018/0215091 A1     Aug. 2, 2018

Related U.S. Application Data

(63) Continuation-in-part of application No. PCT/IL2016/050683, filed on Jun. 27, 2016.
(Continued)

(51) Int. Cl.
*B29C 64/106* (2017.01)
*B29C 64/245* (2017.01)
(Continued)

(52) U.S. Cl.
CPC .......... *B29C 64/106* (2017.08); *B29C 64/245* (2017.08); *B29C 64/295* (2017.08);
(Continued)

(58) Field of Classification Search
CPC ... B29C 64/106; B29C 64/245; B29C 64/295; B29C 64/314; B29C 64/321;
(Continued)

(56) References Cited

U.S. PATENT DOCUMENTS

| | | |
|---|---|---|
| 2006/0103054 A1 | 5/2006 | Pfeifer et al. |
| 2013/0224423 A1 | 8/2013 | Mikulak et al. |

(Continued)

FOREIGN PATENT DOCUMENTS

| | | |
|---|---|---|
| EP | 2676784 | 12/2013 |
| WO | WO2015/009938 | 1/2015 |

OTHER PUBLICATIONS

Supplementary European Search Report for EP Application No. EP16853193 dated May 16, 2019.
(Continued)

*Primary Examiner* — Michael M. Robinson
*Assistant Examiner* — Victoria Bartlett
(74) *Attorney, Agent, or Firm* — The Roy Gross Law Firm, LLC; Roy Gross

(57) ABSTRACT

Systems and methods of additive manufacturing are provided, in which solid polymer material in form of strand(s) or particles is continuously received, and its surface is heated peripherally to liquefy the surface, using specified heating-related parameters which are selected to maintain a central volume of the continuously received solid polymer material in a solid state. The surface of a polymer substrate is also liquefied, and the peripherally heated surface of the continuously received solid polymer material is attached to the liquefied surface of the polymer substrate, followed by re-solidification of the liquefied surface to yield monolithic attachment of the material to the substrate. Liquefying only the surface of the material maintains some of its strength and prevents deformation upon solidification. The monolithic attachment provides uniform and controllable industrial products.

7 Claims, 22 Drawing Sheets

Related U.S. Application Data

(60) Provisional application No. 62/481,707, filed on Apr. 5, 2017, provisional application No. 62/239,291, filed on Oct. 9, 2015.

(51) Int. Cl.
*B29C 64/295* (2017.01)
*B29C 64/314* (2017.01)
*B29C 64/321* (2017.01)
*B33Y 10/00* (2015.01)
*B33Y 40/00* (2020.01)
*B33Y 50/02* (2015.01)
*B29C 64/393* (2017.01)
*B33Y 70/00* (2020.01)
*B29K 23/00* (2006.01)

(52) U.S. Cl.
CPC .......... *B29C 64/314* (2017.08); *B29C 64/321* (2017.08); *B29C 64/393* (2017.08); *B33Y 10/00* (2014.12); *B33Y 40/00* (2014.12); *B33Y 50/02* (2014.12); *B29K 2023/06* (2013.01); *B29K 2023/12* (2013.01); *B33Y 70/00* (2014.12)

(58) Field of Classification Search
CPC .............. B29C 64/393; B29K 2023/06; B29K 2023/12; B33Y 10/00; B33Y 40/00; B33Y 50/02; B33Y 70/00
See application file for complete search history.

(56) References Cited

U.S. PATENT DOCUMENTS

| | | |
|---|---|---|
| 2013/0337256 A1 | 12/2013 | Farmer et al. |
| 2014/0141168 A1 | 5/2014 | Rodgers |
| 2014/0311651 A1 | 10/2014 | Mech |
| 2014/0328964 A1 | 11/2014 | Mark et al. |
| 2015/0096717 A1* | 4/2015 | Batchelder ............ B29C 48/802 165/64 |
| 2015/0108677 A1* | 4/2015 | Mark ...................... B29C 64/30 264/138 |
| 2016/0067921 A1* | 3/2016 | Willis ................... B29C 64/135 264/401 |
| 2017/0072633 A1 | 3/2017 | Hsu |

OTHER PUBLICATIONS

International Search Report of application No. PCT/IL2016/050683 dated Sep. 29, 2016.

* cited by examiner

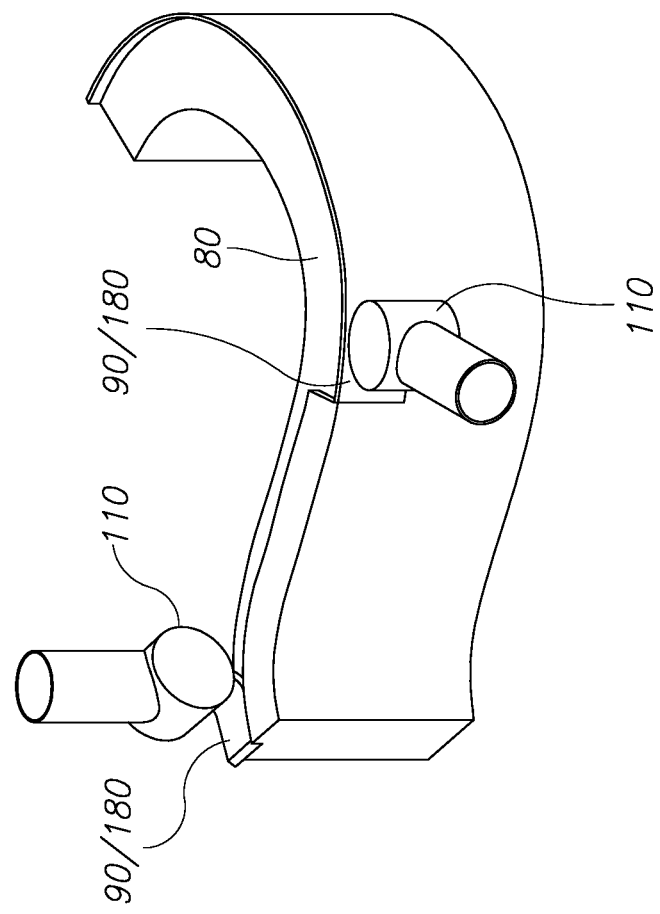
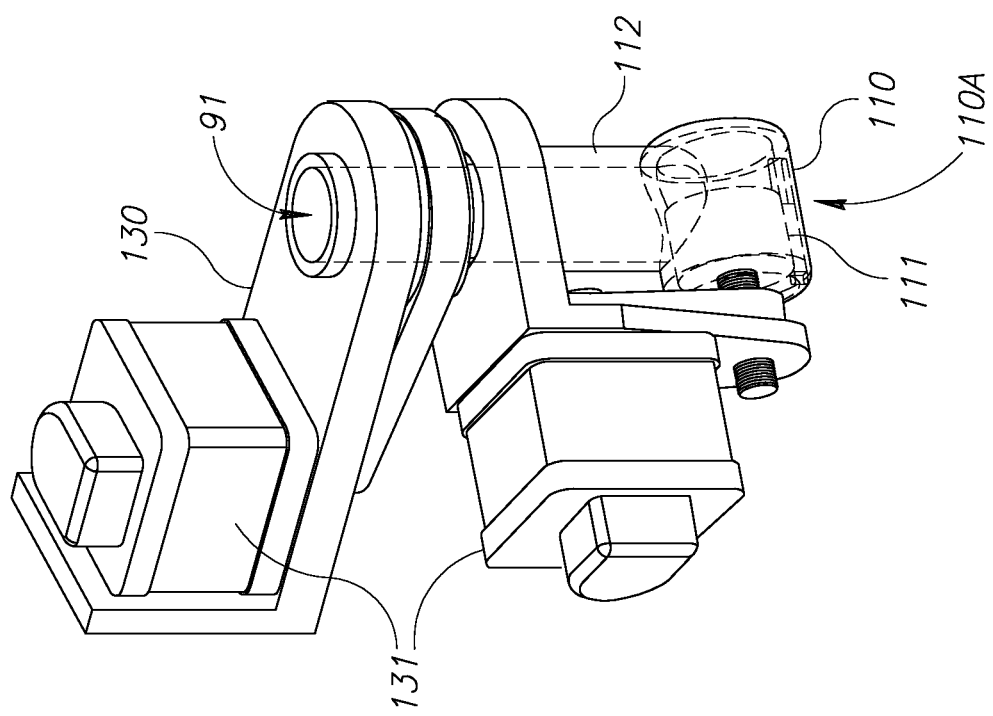
Figure 3A
Figure 3B

185A

185B

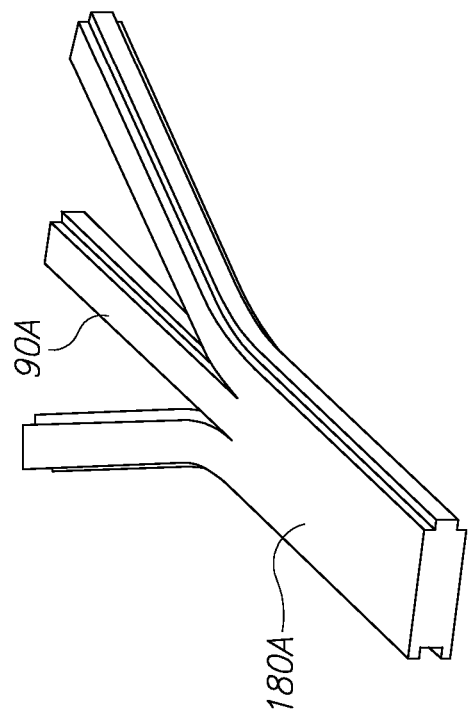
Figure 8A
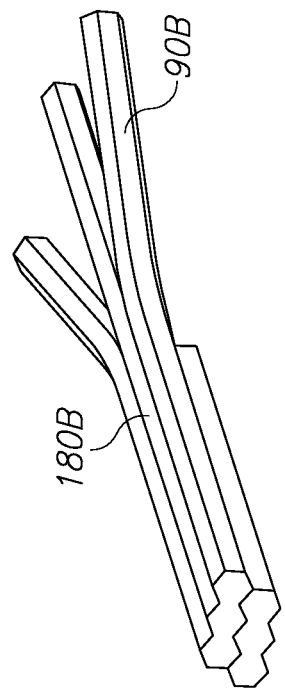
Figure 8B
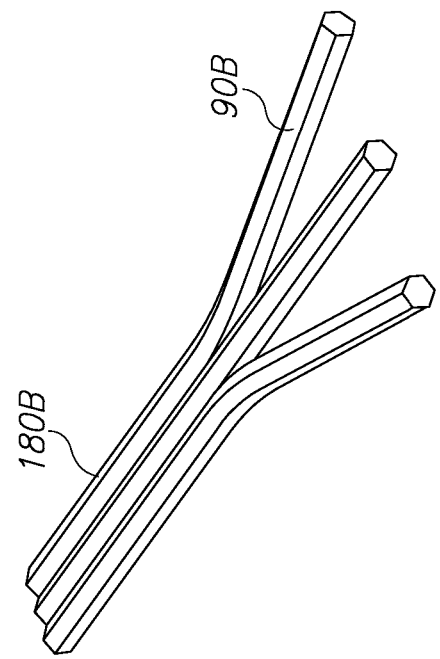
Figure 9A
Figure 9B

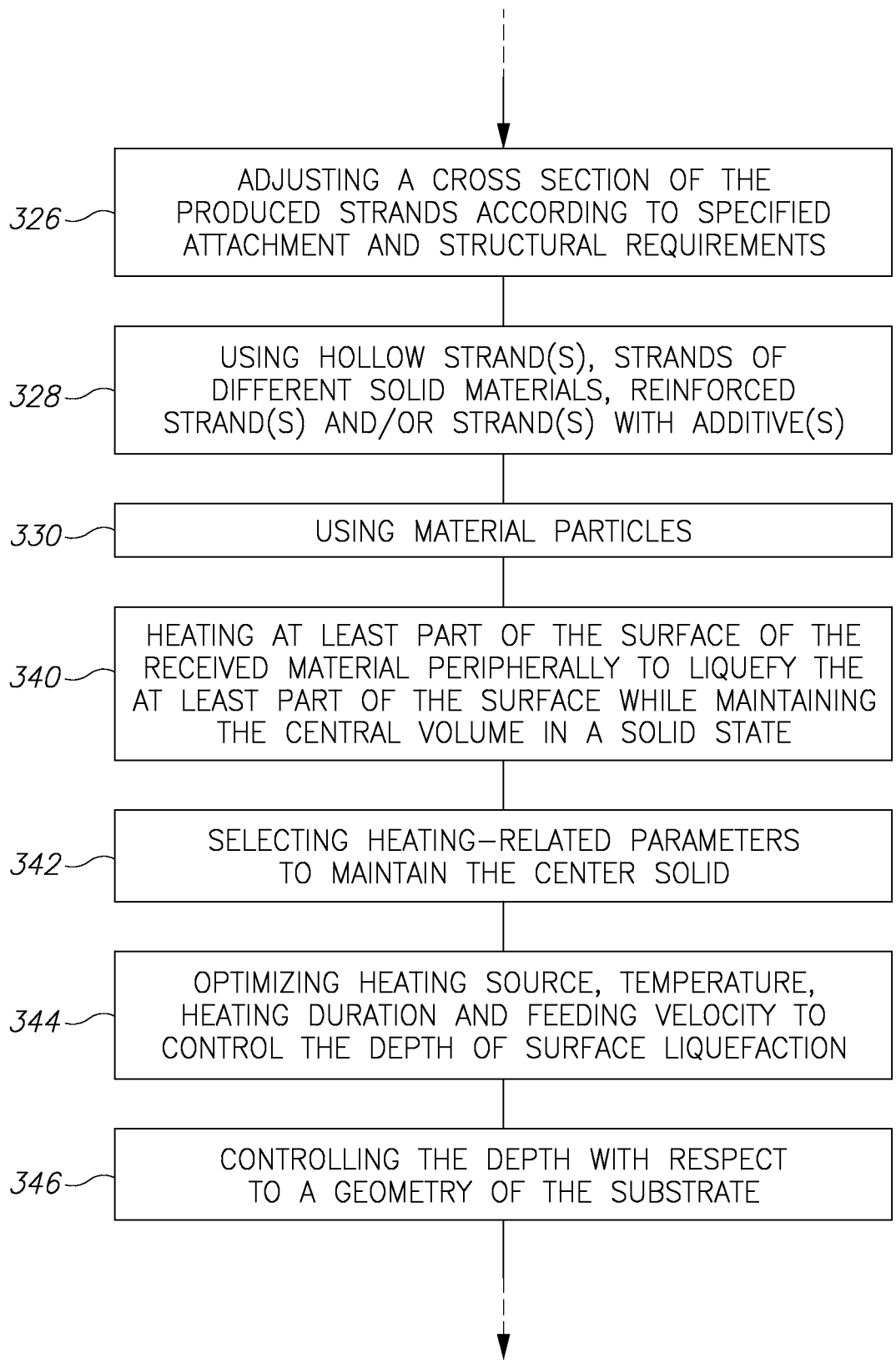
Figure 12 (cont. 1)

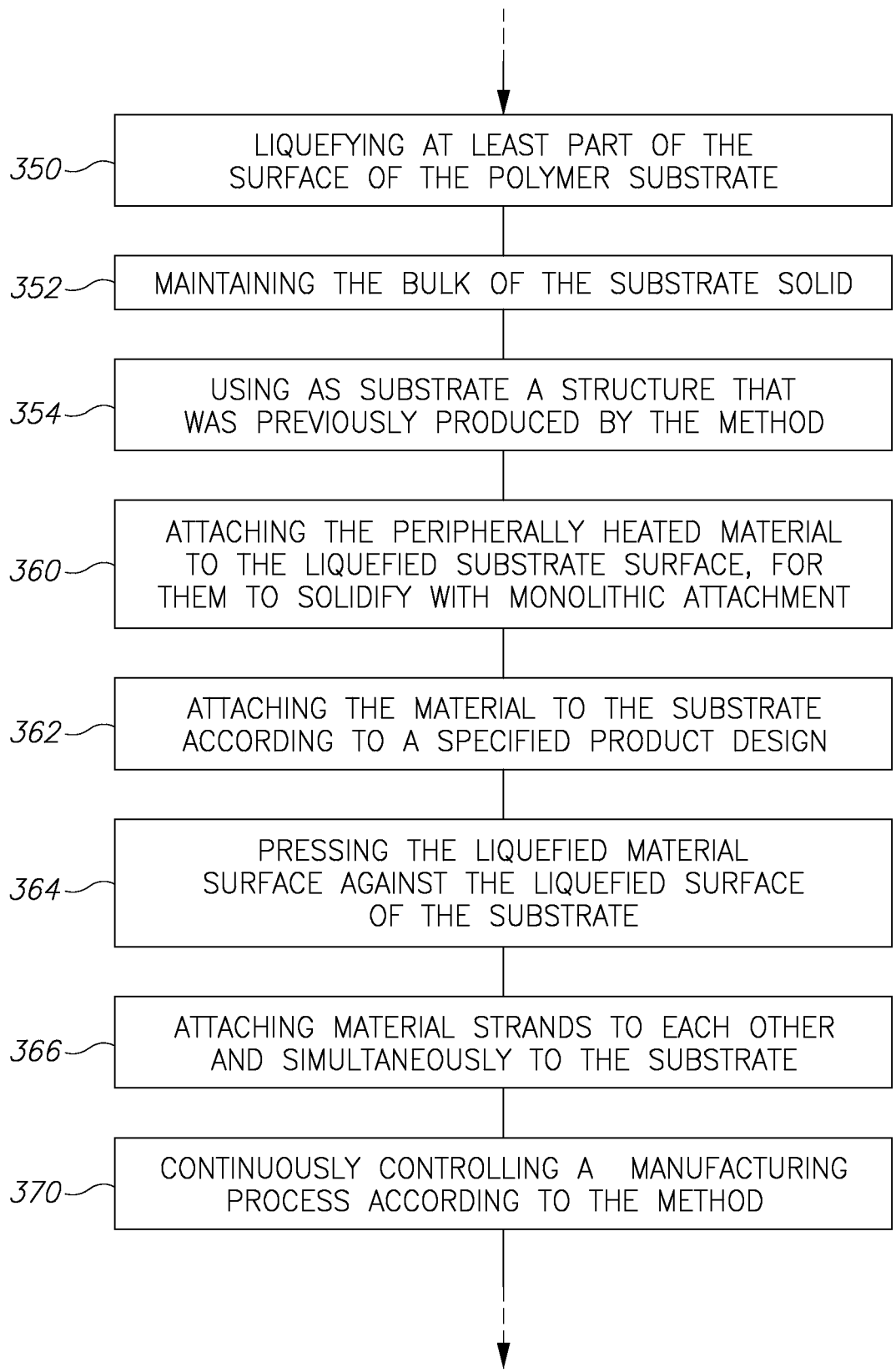
Figure 12 (cont. 2)

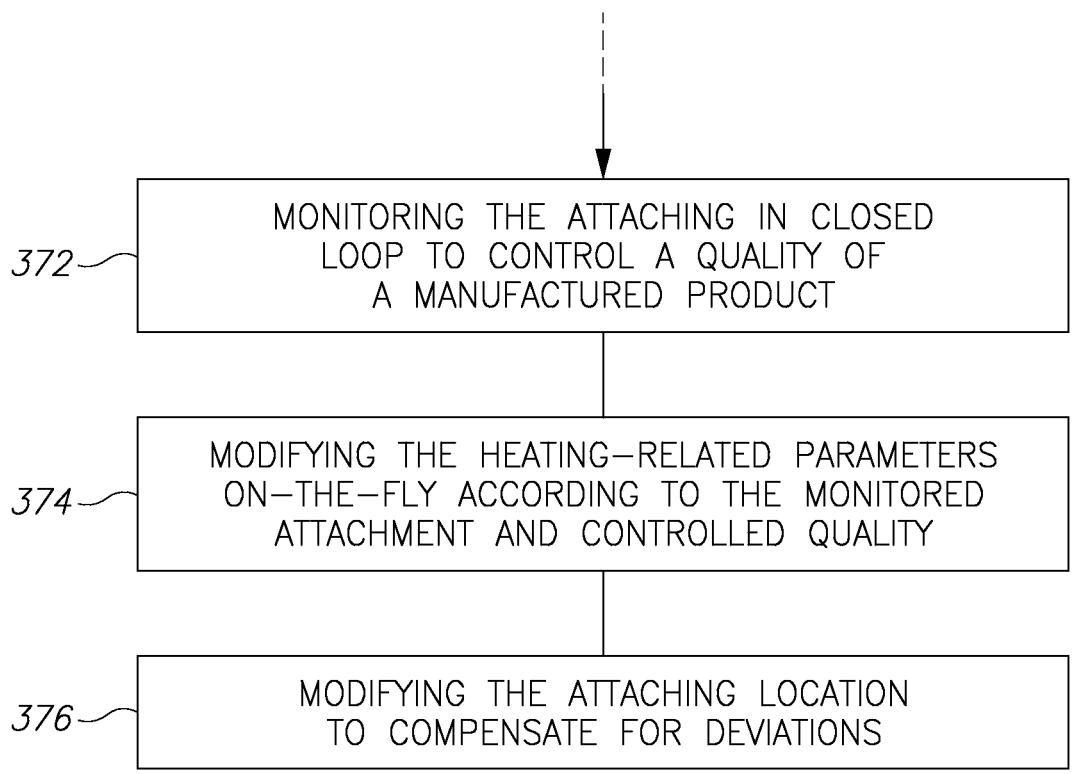
Figure 12 (cont. 3)

ADDITIVE MANUFACTURING USING POLYMER MATERIALS

CROSS REFERENCE TO RELATED APPLICATIONS

This application is a continuation-in-part of WIPO International Application No. PCT/IL2016/050683 filed on Jun. 27, 2016 and claiming priority of U.S. Provisional Patent Application No. 62/239,291 filed on Oct. 9, 2015; and this application also claims the benefit of U.S. Provisional Patent Application No. 62/481,707 filed on Apr. 5, 2017, all of which are incorporated herein by reference in their entirety.

BACKGROUND OF THE INVENTION

1. Technical Field

The present invention relates to the field of additive manufacturing, and more particularly, to additive manufacturing using polymer materials.

2. Discussion of Related Art

Historically, prototype development and customized manufacturing has been performed by traditional methods using metal extrusion, computer-controlled machining and manual modeling techniques, in which blocks of material are carved or milled into specific objects. These subtractive manufacturing methodologies have numerous limitations. They often require specialist technicians and can be time— and labor intensive. The time intensity of traditional modeling can leave little room for design errors or subsequent redesign without meaningfully affecting a product's time-to-market and development cost. As a result, prototypes have been created only at selected milestones late in the design process, which prevents designers from truly visualizing and verifying the design of an object in the preliminary design stage. The inability to iterate a design rapidly hinders collaboration among design team members and other stakeholders and reduces the ability to optimize a design, as time-to-market and optimization become necessary trade-offs in the design process.

Additive manufacturing ("AM") addresses the inherent limitations of traditional modeling technologies through its combination of functionality, quality, and ease of use, speed and cost. AM is significantly more efficient and cost effective than traditional model-making techniques for use across the design process, from concept modeling and design review and validation, to fit and function prototyping, pattern making and tooling, to direct manufacturing of repeatable, cost-effective parts, short-run parts and customized end products.

Introducing 3D modeling earlier in the design process to evaluate fit, form and function can result in faster time-to-market and lower product development costs. For customized manufacturing, 3D printers eliminate the need for complex manufacturing set-ups and reduce the cost and lead-time associated with conventional tooling. The first commercial 3D printers were introduced in the early 1990s, and since the early 2000s, 3D printing technology has evolved significantly in terms of price, variety and quality of materials, accuracy, ability to create complex objects, ease of use and suitability for office environments. 3D printing is already replacing traditional prototype development methodologies across various industries such as architecture, automotive, aerospace and defense, electronics, medical, footwear, toys, educational institutions, government and entertainment, underscoring its potential suitability for an even broader range of industries.

3D printing has created new applications for model-making in certain new market categories, such as: education, where institutions are increasingly incorporating 3D printing into their engineering and design course programs; dental and orthodontic applications, where 3D printed models are being used as replacements for traditional stone models, implants and surgical guides and for crowns and bridges for casting; Furthermore, 3D printing is being used in many industries for the direct digital manufacturing of end-use parts.

Carneiro et al. 2015, Fused deposition modeling with polypropylene, Materials & Design 83:768-776 discuss the suitability of polypropylene (PP) for used in fused deposition modeling (FDM)-based 3D printing.

SUMMARY OF THE INVENTION

The following is a simplified summary providing an initial understanding of the invention. The summary does not necessarily identify key elements nor limit the scope of the invention, but merely serves as an introduction to the following description.

One aspect of the present invention provides a method of additive manufacturing, the method comprising: receiving, continuously, solid polymer material in form of at least one strand or a plurality of particles, heating a surface of the continuously received solid polymer material peripherally to liquefy the surface, using specified heating-related parameters which are selected to maintain a central volume of the continuously received solid polymer material in a solid state, liquefying a surface of a polymer substrate, and attaching the peripherally heated surface of the continuously received solid polymer material to the liquefied surface of the polymer substrate, wherein the attachment to the polymer substrate is achieved by a re-solidification of the liquefied surface to yield monolithic attachment.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings:

FIGS. 3A and 3B are high level schematic illustrations of tips and positioning unit of system, according to some embodiments of the invention.

FIGS. 8A-11 are high level schematic illustrations of various types of strands and their attachment, according to some embodiments of the invention.

DETAILED DESCRIPTION OF THE INVENTION

Figure 1A:
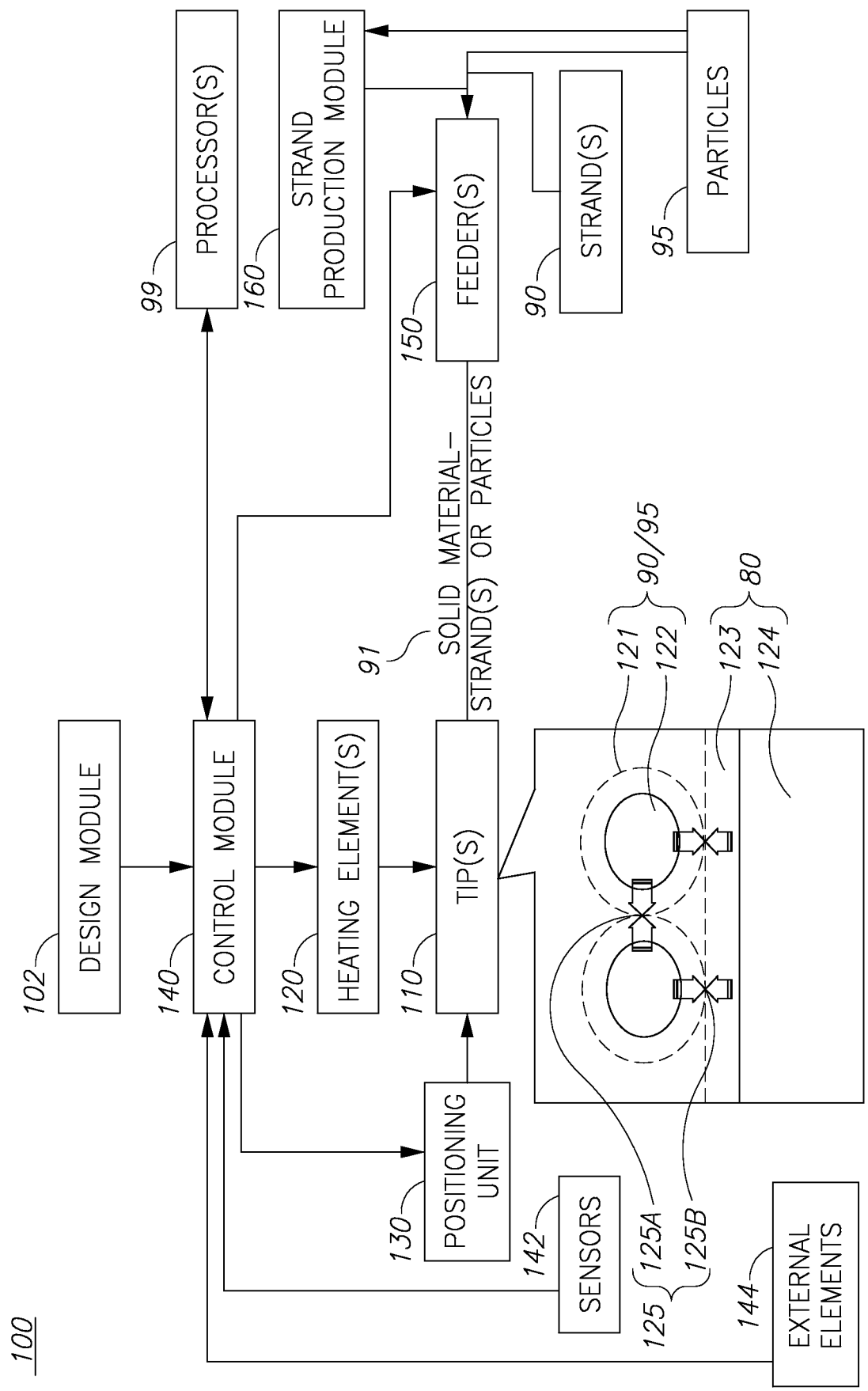
FIG. 1A is a high level schematic block diagram of an additive manufacturing system, according to some embodiments of the invention.

Prior to the detailed description being set forth, it may be helpful to set forth definitions of certain terms that will be used hereinafter.

The term "monolithic attachment" as used in this application refers to the connection of polymer parts at a level defined by given product requirement. The level of monolithic attachment may be selected according to the application. In certain embodiments, the level of monolithic attachment may be such that any two layers, strands and/or particles are separable only upon applying a certain percentage (e.g., 70%, 80%, 90% or 100%, depending on the case) of the force required to tear an equivalent uniform part. In certain embodiments, the monolithic attachment may comprise connecting the layers, strands and/or particles to each other in a uniform way that does not leave traces of the connection interface that are mechanically weaker than the surrounding material (roughly equivalent to 100% force mentioned above).

In the following description, various aspects of the present invention are described. For purposes of explanation, specific configurations and details are set forth in order to provide a thorough understanding of the present invention. However, it will also be apparent to one skilled in the art that the present invention may be practiced without the specific details presented herein. Furthermore, well known features may have been omitted or simplified in order not to obscure the present invention. With specific reference to the drawings, it is stressed that the particulars shown are by way of example and for purposes of illustrative discussion of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways as well as to combinations of the disclosed embodiments. Also, it is to be understood that the phraseology and terminology employed herein is for the purpose of description and should not be regarded as limiting.

Unless specifically stated otherwise, as apparent from the following discussions, it is appreciated that throughout the specification discussions utilizing terms such as "processing", "computing", "calculating", "determining", "enhancing" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. Any of the disclosed modules or units may be at least partially implemented by a computer processor.

The present invention relates to additive manufacturing by robotic 3D real production systems for direct manufacturing of real objects that are subsequently used as products. The manufacturing processes are streamlined to enable production of objects that meet required industrial standards to replace intensive labor and significant investments of production tooling. The present invention enables real production of objects that are generally hard to manufacture or expensive using conventional subtractive manufacturing methodologies. Clearly, the present invention also enables industrial production of small parts as well as production of prototypes and production of simple and cheap parts.

Systems and methods of additive manufacturing are provided, in which solid polymer material in form of strand(s) or particles is continuously received, and its surface is heated peripherally to liquefy the surface, using specified heating-related parameters which are selected to maintain a central volume of the continuously received solid polymer material in a solid state. The surface of a polymer substrate is also liquefied, and the peripherally heated surface of the continuously received solid polymer material is attached to the liquefied surface of the polymer substrate, followed by re-solidification of the liquefied surface to yield monolithic attachment of the material to the substrate. Liquefying only the surface of the material maintains some of its strength, as well as its flexibility and material properties, and prevents deformation and other changes upon solidification. The monolithic attachment provides uniform and controllable industrial products, which cannot currently be produced by polymer additive manufacturing.

FIG. 1A is a high level schematic block diagram of an additive manufacturing system 100, according to some embodiments of the invention. Units in system 100 are illustrated schematically and may be implemented in various ways, some of which illustrated in the following figures.

Units may be associated with processor(s) 99 for carrying out data processing related functions.

Additive manufacturing system 100 comprises one or more feeder(s) configured to feed, continuously, solid polymer material 91 in form of at least one strand 90 and/or a plurality of particles 95 and one or more tip(s) 110 configured to receive, continuously, solid polymer material 91 from feeder(s) 150. In the following, system 100 is sometimes described as having one tip 110 and one feeder 150 for simplicity, without limiting the scope of the disclosure thereto. Tip 110 may be understood as handling a single fed material strand or as handling multiple material strands, as described below.

System 100 further comprises at least one heating element 120 configured to heat tip 110 to a specified temperature. At least one heating element 120 is further configured to liquefy by heating at least part of a surface 123 of a polymer substrate 80 (leaving a bulk 124 of substrate 80 solid) and/or to liquefy by heating at least part of a surface 121 of fed material 91 as the polymer substrate, leaving a core 122 of material 91 solid. The actual depth of the part(s) of surfaces 121, 123 which are liquefied may vary depending on various parameters such as form and type of fed material 91 and substrate 80 (respectively), heating-related parameters as presented below etc. The depth of the liquefied surfaces may be selected to maintain large enough material core 122 and substrate bulk 124 solid to provide required mechanical and shape properties of the produced part, while optimizing the solidification process and resulting part properties. For example, deeper liquefied surfaces require more intense heating yet provide more solidification time than shallower liquefied surfaces. The surface depths may be monitored and adjusted as part of the realtime process control described below.

In certain embodiments, up to 50% of the cross sectional area of material 91 may be liquefied, leaving at least 50% of the cross sectional area of material 91 solid. Liquefied surface parts 121 may be circumferential or may extend only to one or more sides of the cross sectional area of material 91. For example, only one, two or three sides of a square cross section may be liquefied.

Tip 110 and substrate surface 123 may be heated by the same or by different heating elements 120. Tip 110 is further configured to heat a surface 121 of continuously received solid polymer material 91 peripherally to liquefy surface 121, using specified heating-related parameters which are selected to maintain a central volume 122 of continuously received solid polymer material 91 in a solid state.

Advantageously with respect to prior art such as Carneiro et al. 2015, (in which PP strands are molten prior to deposition), heating only the periphery of the polymer substrate and of the polymer material, possibly to a shallow depth and for a short time, prevents shrinkage upon re-solidification 125 (denoted in FIG. 1A by thick arrows) and ensures good shape control of the resulting manufactured parts.

Moreover, disclosed systems 100 and methods 300 provide additive manufacturing which is applicable to industrial processes and enable additive manufacturing of actual industrial parts, rather than merely of models as in the prior art. In particular, quality control is integrated in the manufacturing process, which provides uniform and closely monitored parts. Disclosed systems 100 and methods 300 are configured as robust additive manufacturing system and methods which enable handling received materials in the order of magnitude of several kilograms or several tens of kilograms per hour. Clearly, multiple systems 100 may handle larger amounts, and smaller system configurations may handle smaller amounts and finer details (e.g., ranging down to grams).

Liquefying only the periphery of received material 91 maintains the material strength during manufacturing, enabling production of overhanging structures (see e.g., FIGS. 7A, 7C, 7E, 7F below) without the need for additional supports and enables guiding or flexing received material 91 during production to achieve required shapes and surface/bulk features. The strength of the material core which is maintained solid enables production of overhanging structures without the need for additional supports, which is unheard of in the current state of the art. The monolithic attachment of received material 91 to substrate 80 maintains uniform mechanical characteristics throughout the manufactured parts.

The specified heating-related parameters may comprise, as examples, a selection of the heat source (e.g., a contact heater, a hot air or other convective heater, a radiative heater such as a halogen or infrared heater, and inductive heater, a laser heater etc.), a heating temperature, a heating duration as well as feeding parameters such as a feeding velocity (or a feeding force) of solid material 91, which determine the heating duration of fed material 91.

Additive manufacturing system 100 is further configured to attach peripherally heated surface 121 of continuously received solid polymer material 91 to liquefied surface 123/121 of polymer substrate 80/91 (respectively), wherein the attachment to the substrate is achieved by a re-solidification 125A/125B (respectively) of the liquefied surface to yield monolithic attachment. As illustrated in FIG. 1A, any of the following options may be manufactured by system 100: two or more strands 90 may be attached to each other (one or more strand(s) being the respective substrate), particles 95 may be attached to each other (one or more particle(s) being the respective substrate) and/or at least one strand or particles as material 91 may be attached to substrate 80, which may comprise a structure that was previously produced by additive manufacturing system 100, e.g., one operating layer by layer. Material 91 may be fed as bulk material, pellets, bids, rods, wires etc., may possibly comprise more than one material to provide composites, and may be possibly pre-processed. In any of these cases, the same operation principle is used, namely liquefying only the surfaces of the attached elements to provide monolithic attachment without form change upon re-solidification. This operation principle enables production of parts having controlled and uniform characteristics.

Tip 110 may be further configured to receive, continuously, a plurality of solid material strands 90, which are attached to each other by re-solidification 125A of their liquefied surfaces 121, according to a spatial feeding configuration (e.g., a linear arrangement of strands 90 next to each other, or other configurations, see FIGS. 7A-7F for various non-limiting examples). Attachment may be assisted by tip 110 being further configured to press strands 90 against each other to enhance their attachment and/or by feeder 150 being further configured to feed strands 90 at specified angles with respect to each other that enhance their attachment.

Tip(s) 110 may have a wide range of designs, corresponding to fed material 91, heating requirements and product design. For example, tip(s) 110 may comprise one or more openings, possibly with different shapes and sizes, and each process or process step may be used one, some or all of the openings. On or more opening in tip 110 may have an adjustable cross section. Tip(s) 110 may comprise additional elements such as co-dispensers of molten or semi-molten material and/or vibration units (internal or external, possibly using ultrasound). Tip(s) 110 may comprise guiding elements to guide material movement through tip(s) 110, wipers blending and smoothing material 91 and/or attached material 91 as well as possibly pre-heating and post-cooling elements (e.g., laser heating element).

Feeder(s) 150 may be further configured to control feeding parameters of each strand 90 fed to tip 110. Feeding parameters may be used to control the form of the produced part, e.g., gradually increasing feeding speed in one direction of linearly fed strands may be configured to yield a bend of the produced part to the opposite direction—bending toward the slowly fed strands. For example, e.g., strands which are fed at higher speed curve inwards, toward strands which are fed at lower speed.

Strands 90 may have any form of cross section (e.g., rectangular, round, triangular, hexagonal etc., see FIGS. 3B, 4B, 5, 7A, 8A, 9A, 10A, and 11 for non-limiting examples) and may be full or hollow (in case of hollow strands an inner periphery of the hollow in the strand is left solid during attachment). Strand cross section may be modified by the attaching process by the surface liquefaction and possible due to applied pressure. Attached strands 90 may differ, e.g., one or more of strands 90 may be made of different solid materials, one or more strands 90 may be reinforced (e.g., by carbon fibers) and/or one or more of strands 90 may have additive(s) (e.g., fillers, colorants etc.). Using strands 90 of various types enables manufacturing complex parts, having specifically designed features. For example, system 100 may be used to manufacture parts such as containers having walls made of the strands (see FIG. 2 for a non-limiting example). The walls may have an external colored surface manufactured using external colored strands, intermediate light weight bulk manufactured using middle hollow, possible reinforced strands and inner passivated surface manufactured using inner strands with corresponding additives that suppress chemical reactivity.

System 100 may further comprise a strand production module 160 configured to produce strands 90, continuously and simultaneously (on-line) with the feeding of strands 90 to tip 110. Strands 90 may be produced from melting particles (e.g., by extrusion) just prior to their use in tip 110, after undergoing shape regulation in strand production module 160. For example, strand production module 160 may be configured to adjust a cross section of the produced strands according to specified attachment and structural requirements. Alternatively or complementarily, strands 90 may be fed by feeder 150 to tip 110 from rolls of strand produced off-line with respect to the operation of system 100.

System 100 further comprises a positioning unit 130 configured to position tip(s) 110 with respect to substrate 80 according to a specified product design. Positioning unit 130 may follow detailed additive manufacturing process parameters to produce products or parts after specifications (which may be adapted to the unique manufacturing characteristics of system 100). Positioning unit 130 may comprise one or more robotic units configured to position and maneuver tip(s) 110 according to the designed manufacturing process. Positioning unit 130 may comprise any of gantry(ies), bridge(s), robot(s), linear and rotary axes, rails, pulley(ies) etc. Positioning unit 130 may be configured to operate multiple tip(s) 110, possibly manufacturing multiple parts, simultaneously.

Positioning unit 130 may be further configured to position tip 110 to press peripherally heated surface 121 of continuously received solid material 91 against substrate 80. Tip 110 may be configured to continuously receive and attach to each other multiple solid material strands 90, and position unit 130 may be configured to position tip 110 to simultaneously attach strands 90 to substrate 80 (see FIGS. 6A-6F for non-limiting examples).

System 100 further comprises a control module 140 configured to control any of feeder(s) 150, heating element(s) 120 and positioning unit 130 and to monitor the attachment in closed loop to control a quality of the manufactured product. For example, the closed loop control may be implemented by control module 140 being configured to modify the feeding parameters and/or the specified heating parameters to determine a depth of surface liquefaction 121 with respect to a geometry of substrate 80, while maintaining central volume 122 in a solid state. Control module 140 may be configured to modify the specified heating and/or feeding parameters on-the-fly according to the monitored attachment and controlled quality. It is emphasized that control module 140 provides continuous control of the manufacturing process (not merely a layer-by-layer control as in other additive manufacturing processes) and continuously ensures the quality of the produced part.

Control module 140 may comprise multiple sensors 142 of various types (e.g., laser scanners, cameras, IR sensors, inductive and capacitance sensors, acoustic sensors, temperature sensors) configured to monitor the production process, e.g., measure positions of system elements, measure temperatures such as actual material and nozzle temperature profile and compare to planned and or past data, surface temperatures, measure material properties (e.g., volume, material mixtures and properties of material components) and their variation. Control module 140 is further configured to correct any of the measured features by modifying heating and feeding parameters, positioning unit movements etc. For example, correction criteria may be set, such as volumetric and dimensional constraints and tolerances for part parameters such as size, surface features, flatness and perpendicularity, critical features (e.g., a hole, a flange, connectors etc.), material strength, standards, textures etc. Process corrections by control module 140 may be carried out on the fly (real time) and/or at spatio-temporal intervals or after production. Corrections may be implemented by using the measured variation to (i) adjust the planned dimension to actual manufactured features (adaptive manufacturing, e.g., changing manufacturing parameters according to certain shifts in the substrate), (ii) create gradual corrections to gradually restore the dimensions to the original design, (iii) suggest or prompt design modification, (iv) add supports that correspond to monitored variation and/or (v) change material flow characteristic (e.g., size of orifice in tip 110, temperature, geometry of molten mass, process speed, etc.). Additionally or alternatively, control module 140 may be configured to use other devices or external elements 144 for carrying out the corrections such as second end-effectors or elements—for example, heat/cooling sources, wipers, hammer-like units, spindles and/or final machining or other external robots or machines.

Solid polymer material 91 and/or polymer substrate 80 may comprise polypropylene (PP) or polyethylene (PE) which have large thermal expansion coefficients (in the order of magnitude of $10^{-4}$ m/(m K) and higher). System 100 and method 300 disclosed below enable additive manufacturing at industrial scale using PP or PE which is not possible with prior art technology, as the latter liquefies all the material, which then undergoes shape and dimensional changes upon re-solidification that contort the manufactured product and result in uneven mechanical properties of the product. In contrast, the disclosed systems and methods maintain the form and the mechanical properties of solid central volume 122 of the polymer material and provide uniform re-solidification and uniform mechanical attachment of material 91 to substrate 80 resulting in shape and mechanical properties of the manufactured products which can be designed to yield industrially viable parts. Moreover, the closed loop process controls provides on-line verification of the quality of manufacturing, ensuring uniform part batches according to design and having uniform mechanical properties. Clearly, polymer materials with smaller thermal expansion coefficients (e.g., in the order of magnitude of $10^{-5}$ m/(m K) and lower, e.g., ABS-acrylonitrile butadiene styrene, PC-polycarbonate etc.) may also be used.

System 100 may further comprise a design module 102 configured to produce a proper process design of given parts using system 100. For example, material 91 may be optimized for certain requirements, added layers may be design according to product requirements, positioning unit movements may be minimized, material cuttings reduced and special features may be adapted for the additive manufacturing (e.g., sharp corners). Design module 102 may receive modifications from control module 140 during and after manufacturing to improve the process design and the manufacturing process.

Figure 1B:
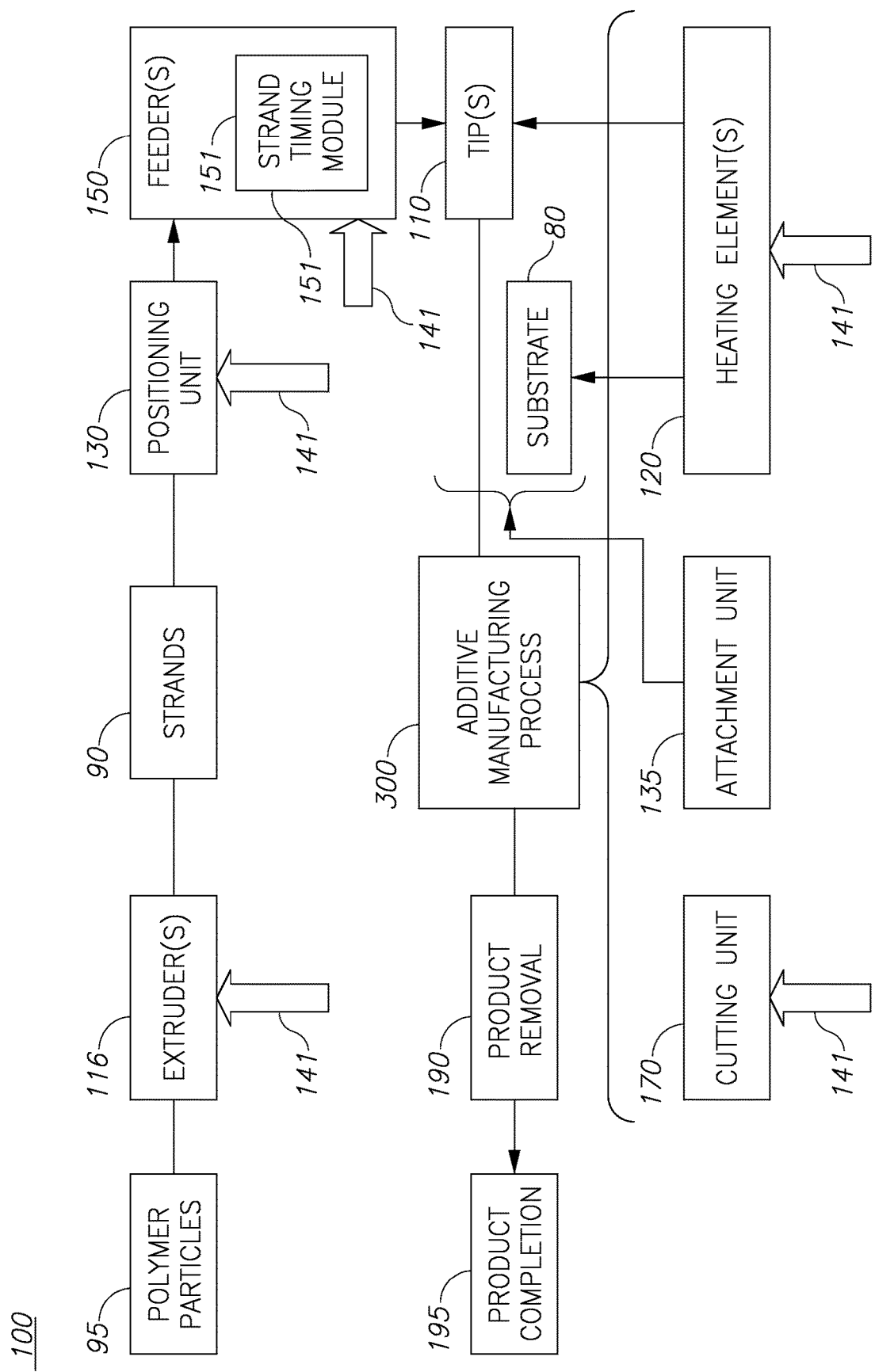
FIG. 1B is a high level schematic illustration of a flow in the additive manufacturing system and their modification possibilities, according to some embodiments of the invention.

FIG. 1B is a high level schematic illustration of a flow in additive manufacturing system 100 and their modification possibilities, according to some embodiments of the invention. FIG. 1B illustrates schematically the flow, starting from raw material such as polymer particles 95 which may comprise PP or any other thermoplastic polymer possibly with various additives (e.g., UV protective materials, fillers) and various reinforcement components (e.g., carbon fibers, glass fibers etc.), which is drawn to strands 90 by an extruder 161 as a non-limiting example, either on-line or off-line with respect to the operation of system 100. Strands 90 may have any cross section (round, square, triangular), any dimension or form, and may be co-extruded from more than one extruder and comprise multiple materials. Extruder(s) 161 may be controlled 141 by control unit 140 to provide strands that correspond to product requirements and to provide online closed loop manufacturing control and quality assurance (QA).

Positioning unit 130 may comprise any system such as robotic units, arms, gantries, bridges or even remotely controlled rotorcraft(s), and may also be controlled 141 by control unit 140 to control the positions and movements of components of system 100 (at all directions) and particularly of tip(s) 110 according to product requirements and to provide online closed loop QA.

Feeder(s) 150 may comprise a strand timing module 151 which feeds strands 90 to tip 110, possibly at different speeds relating to the geometric configurations of part production, heating parameters, strand materials and possibly synchronized with extruder(s) 161. Feeder(s) 150 and/or strand timing module 151 may be controlled 141 by control unit 140 to control the feeding parameters of each strand (together or separately) according to product requirements and to provide online closed loop QA. Strand timing module 151 enables exact control on strand feeding speed and provides full control on the geometry of the manufactured product, e.g., by providing feeding speeds that correspond to specific product radii and surface features, by providing corresponding strands to specific product parts and modifying the composition of strands during manufacturing and so forth.

Tip(s) 110 may comprise any multi-channel unit for handling multiple strands and for heating and attaching the strands to provide manufactured stripes (see FIGS. 3B, 6A-6F, 7A, 7D-11) to be added to substrate 80. Tip(s) 110 may have various cross sections, constant or variable, and may enable control of the feeding angles of the strands. Heating element(s) 120 may utilize various heating technologies as listed above (contact, convection, radiation, induction, laser etc.) to heat tip(s) 110 and substrate 80, in either same or different means and according to corresponding requirements. The heating levels as part of the heating parameters may be adjusted according to product specifications, geometry and strand materials, and may be controlled 141 by control unit 140 to according to product requirements and to provide online closed loop quality assurance (QA).

System 100 may comprise an attachment unit 135 configured to attach material 91 with liquefied surface to substrate 80, e.g., attach a stripe 180 (see e.g., FIGS. 3B and 6F) to substrate 80 controllably, e.g., using a roller. System 100 may further comprise a cutting unit 170 configured to cut edges of stripes 180 to provide finish requirements of the produced parts (e.g., using a laser cutter). Once additive manufacturing 300 is finished, the manufactured product is removed from the manufacturing region 190 (or system 100 moves to a different production region) and the product is completed 195 (e.g., is added components, finished, assembled, etc.) and tested.

Figure 2:
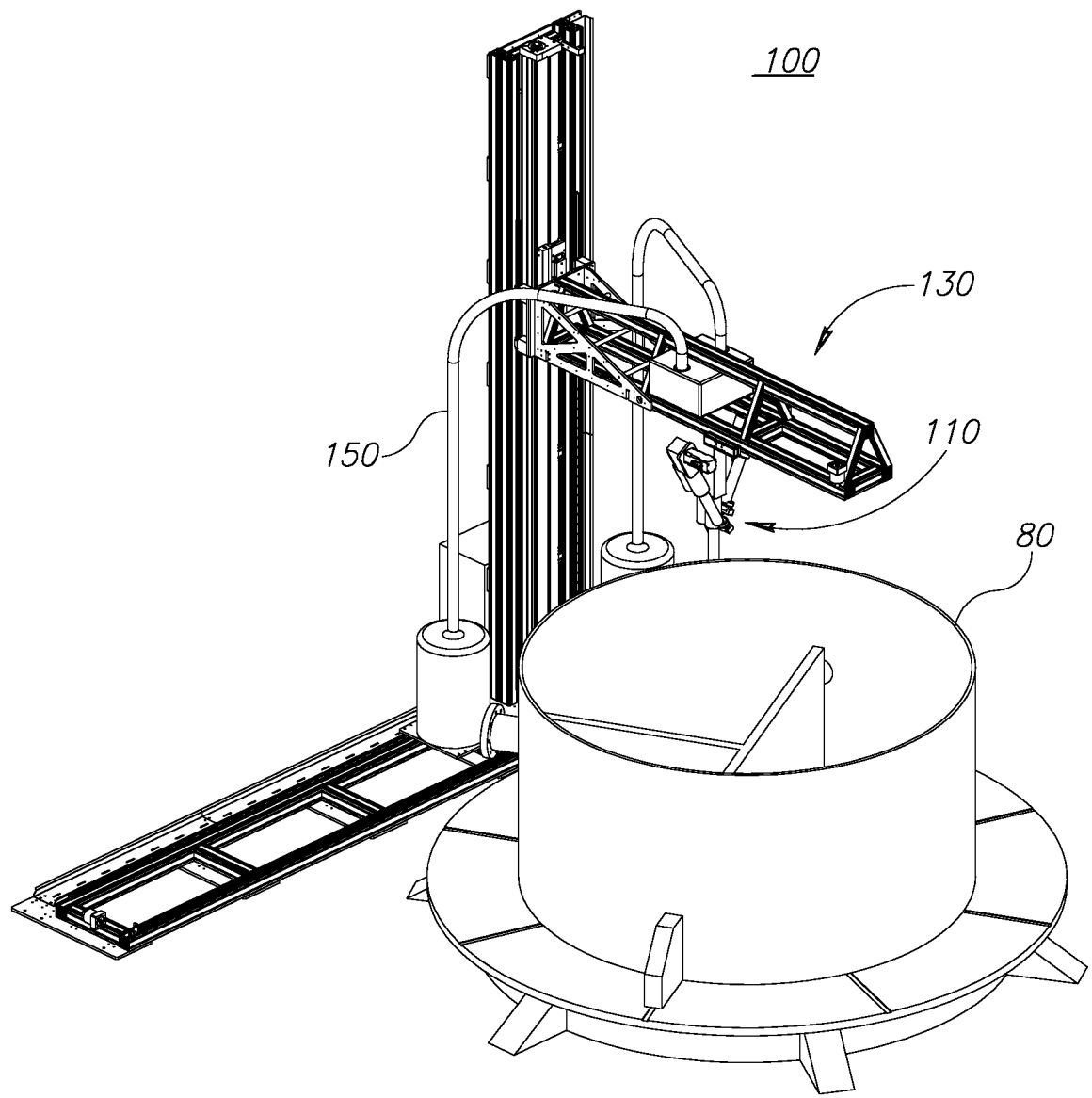
FIG. 2 is a high level schematic illustration of the system, additively manufacturing a cylindrical part, according to some embodiments of the invention.

FIG. 2 is a high level schematic illustration of system 100 additively manufacturing a cylindrical part, according to some embodiments of the invention. FIG. 2 schematically illustrates substrate 80 as an additively-manufactured cylindrical part such as container, possibly positioned on a turntable (associated with positioning unit 130 and controlled by control unit 140) and being produced by additive manufacturing via tip 110 receiving material from feeder 150 and positioned by positioning unit 300. Control unit 140 is not shown, yet may comprise remote user interface (e.g., via a cloud service, communication link, etc.), a design module and corresponding monitoring and control software. The cylindrical part may be manufactured simultaneously by multiple tip(s) 110.

FIGS. 3A and 3B are high level schematic illustrations of tips 110 and positioning unit 130 of system 100, according to some embodiments of the invention. In the illustrated non-limiting design, positioning unit 130 may comprise motor(s) 131 configured to position tip 110 correctly, a cavity 112 through which material 91 is fed and a plunger as an aperture control member 111 configured to modify the size and possibly form of an aperture 110A in tip 110. Plunger 111 is possibly controlled by one of motor(s) 131. Heating the surface of material 91 may be carried out via aperture control member 111 (such as the plunger) and/or via cavity 112. One or more tip 110 may be used to deposit material on substrate 80 in any direction, e.g., on horizontal or vertical surfaces of substrate 80. The deposited material may comprise attached broad strands 90 and/or stripes 180 composed from thin strands 90 attached to each other in tip 110.

Figure 4B:
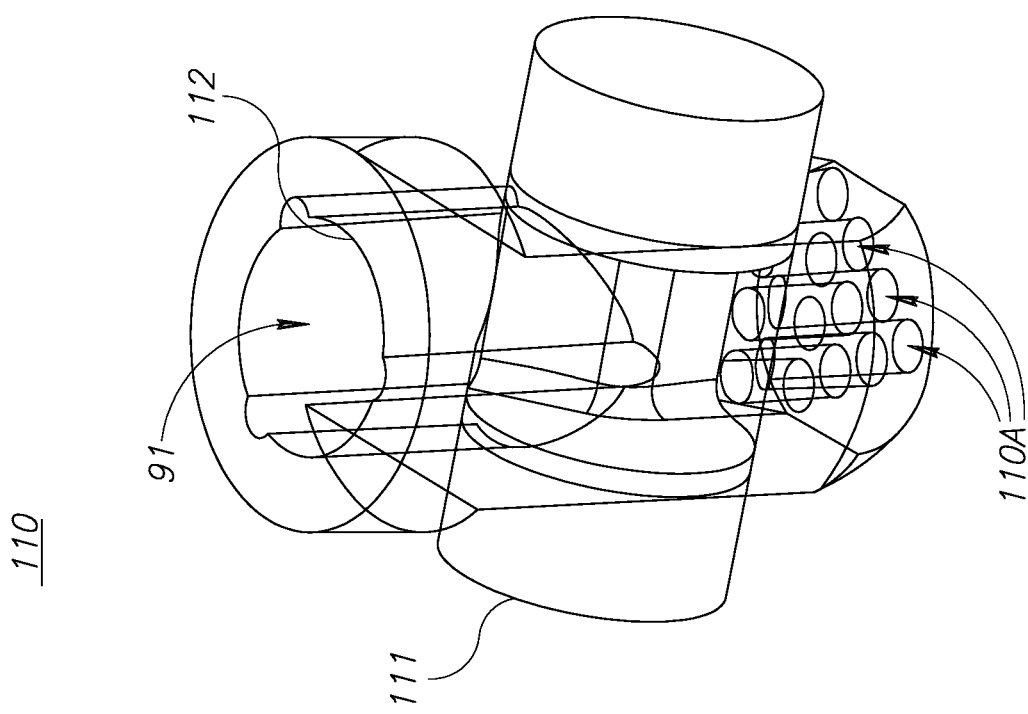
FIGS. 4A and 4B are high level schematic illustrations of tips of the system, according to some embodiments of the invention.
Figure 4A:
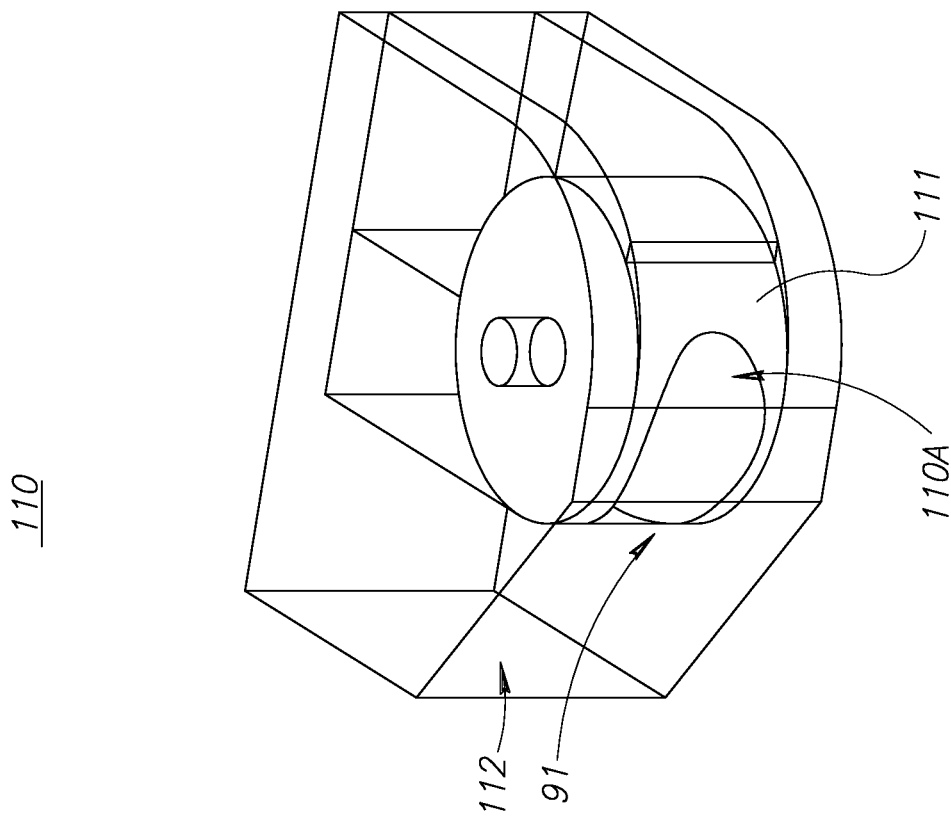

FIGS. 4A and 4B are high level schematic illustrations of tips 110 of system 100, according to some embodiments of the invention. In FIG. 4A, aperture control member 111 is illustrated as a rotary unit with a channel of variable opening. Upon rotation of rotary unit 111, the size and form of aperture 110A in tip 110 changes to modify the extruded material. In FIG. 4B, aperture control member 111 is illustrated as a rotatable rod having a varying profile that controls a number of available apertures 110A in tip 110, which may receive strands 90. Heating the surface of material 91 may be carried out via aperture control member 111 (such as the rotary unit or rotatable rod) and/or via cavity 112.

Figure 5:
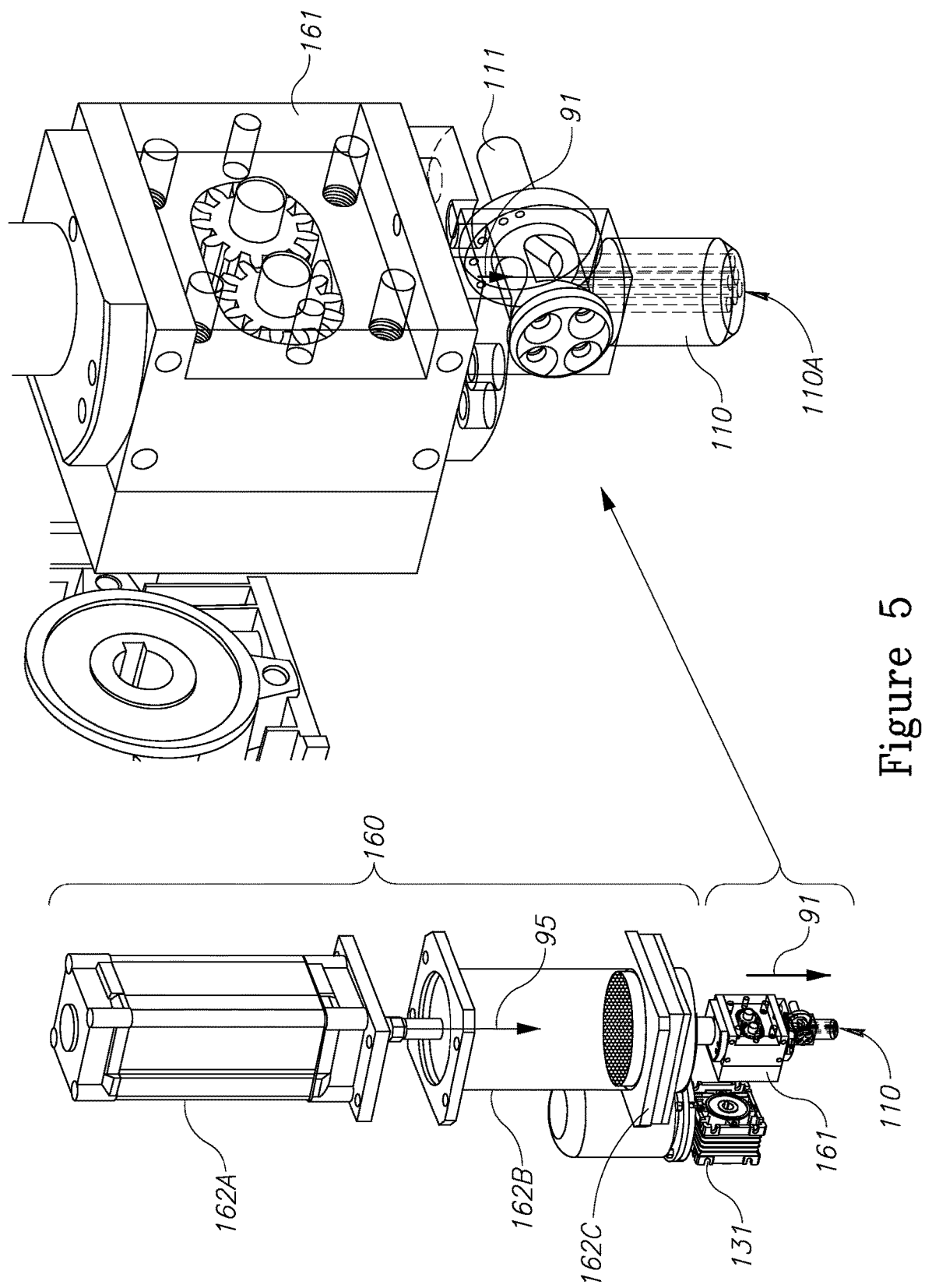
FIG. 5 is a high level schematic illustration of an exemplary strand production module and tip, according to some embodiments of the invention.

FIG. 5 is a high level schematic illustration of exemplary strand production module 160 and tip 110, according to some embodiments of the invention. In the illustrated non-limiting embodiments, strand production module 160 may comprise a piston 162A pushing raw material 95 such as pellets into a raw material container 162B. The raw material is then melted by heater 162C and extruded by extruder 161 (e.g., a dosage pump driven by motor 131 through multiple holes) to provide solid strands 90 to tip 110, in which the surfaces of strands 90 may be liquefied prior to their attachment. Aperture control member 111 may be configured similarly to the illustration in FIG. 4B to control the number of strands 95 provided to tip 110 and exiting aperture(s) 110A.

Figure 6A:
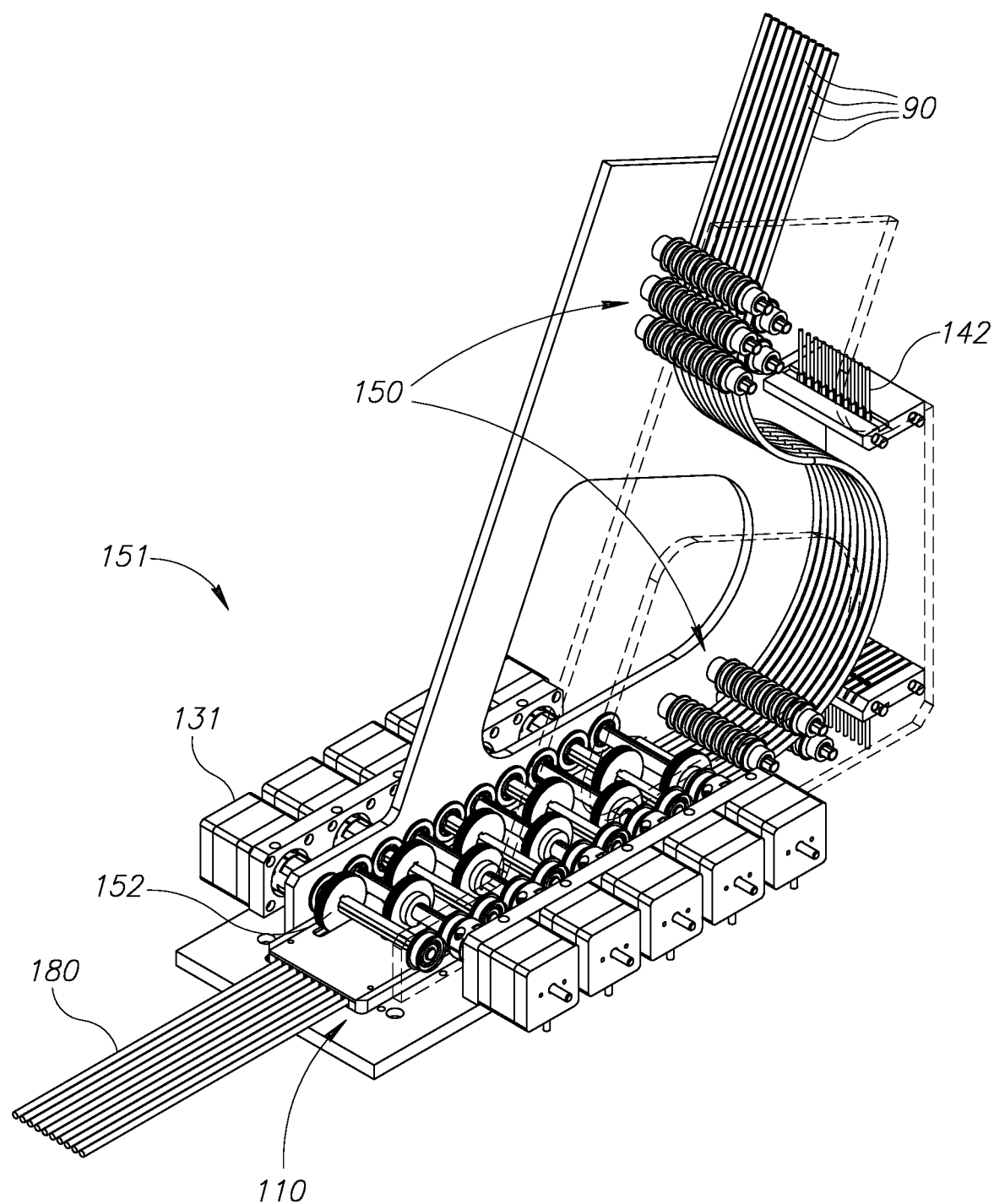
FIGS. 6A-6F are high level schematic illustrations of the system using strands as added material, according to some embodiments of the invention.
Figures 6B, 6C:
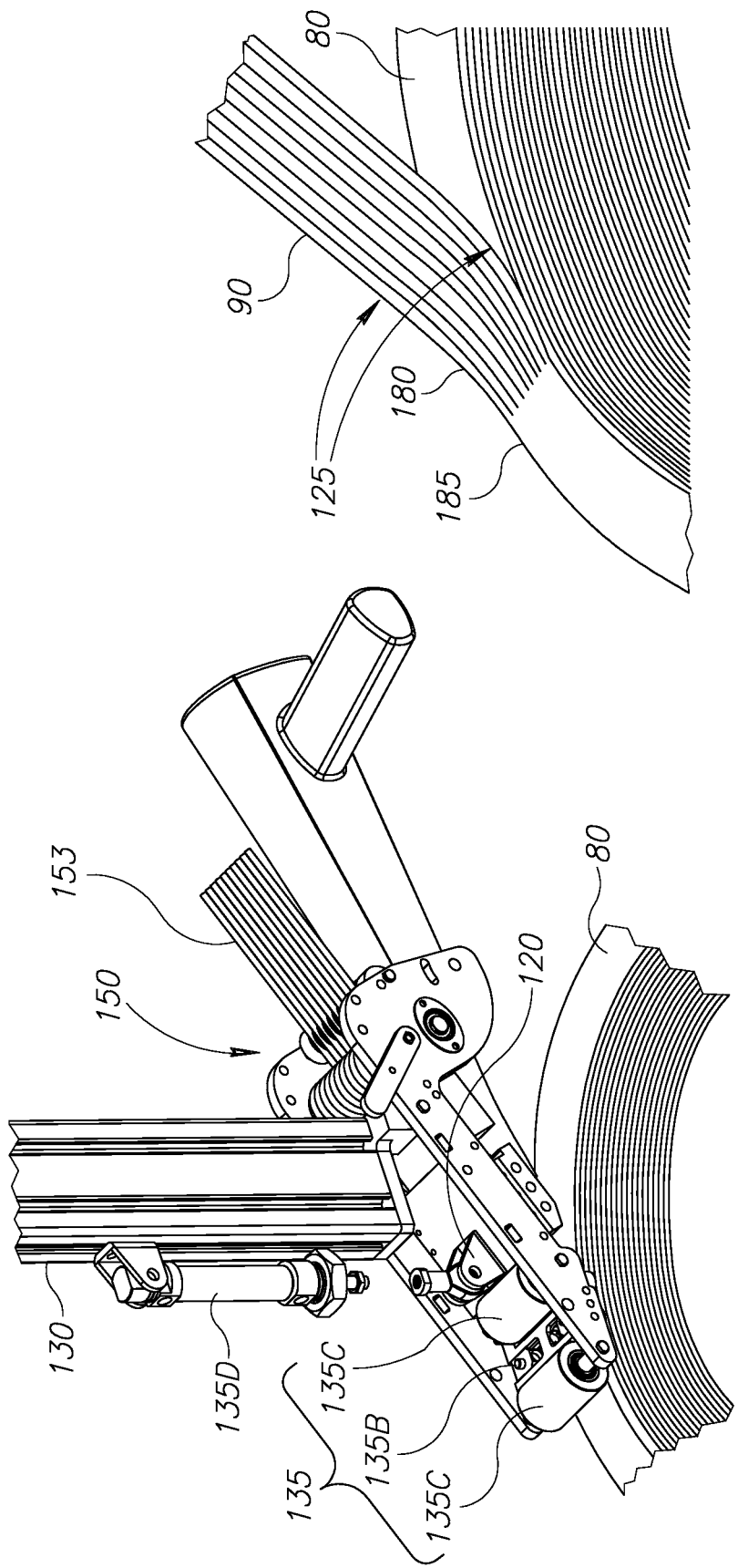

FIGS. 6A-6F are high level schematic illustrations of system 100 using strands 90 as added material 91, according to some embodiments of the invention. FIG. 6A schematically illustrates feeder 150 receiving strands 90 and directing them to tip 110 and comprises strand timing module 151 having a plurality of motors 131 and wheels 152 driven by respective motors 131 and configured to move and control strands 90 fed to tip 110 (e.g., with respect to required manufacturing geometry). Sensors 142 may be configured to provide feedback on strand status (e.g., strand presence and type, velocity etc.). The separate control of each strand 90 provides precise control on the manufacturing process. FIG. 6B schematically illustrates attachment unit 135 comprising a guiding roller 135C, side rollers 135B and an attachment roller 135C configured, respectively, to guide strands 90 towards tip 110, secure the lateral positions of strands 90 and possibly press strands 90 against each other, and ensure adhesion and contact between strands 90 and/or attached strands 180 and substrate 80. Positioning unit 130 may further comprise a piston 135D for pressing tip 110 against substrate. Attachment of strands 90 to substrate 80 may comprise a relative movement therebetween to enhance the uniformity of the re-solidification. Heating element 120 may be positioned adjacent to attachment unit 135 to liquefy strand surfaces. Feeder 150 may comprise guides 153 configured to feed strands 90 at specified angles into tip 110, either parallel or at specified angles which may be selected to provide additional lateral pressure among strands 90 that may be selected to further enhance their attachment. Guides 153 may be configured to provide a selected spatial configuration of strands 90, as exemplified below. FIG. 6C schematically illustrates substrate 80 having strands 90 attached to each other to form stripe 180 which is simultaneously of consecutively attached as added material 185 to substrate 80. Either or both substrate 80 and tip 110 may be moved to provide continuous addition of material 185. Re-solidification 125 is shown schematically, both for strands 90 attaching to each other and for stripe 180 to substrate 80.

Figure 6E:
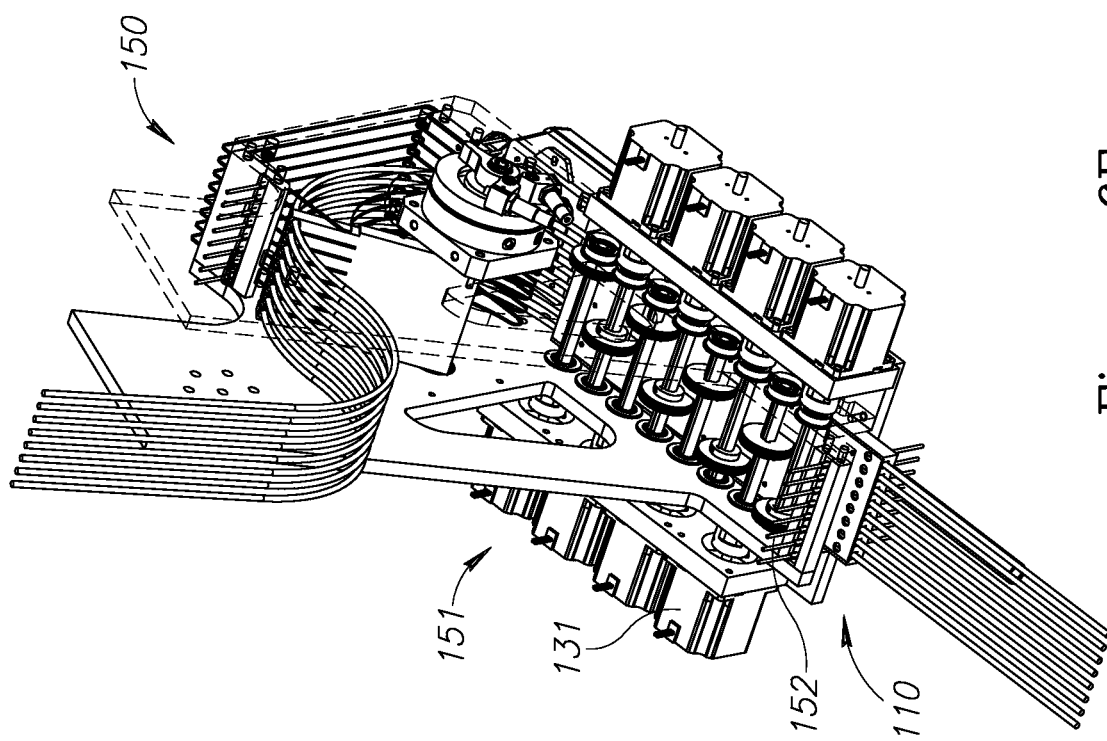
Figure 6D:
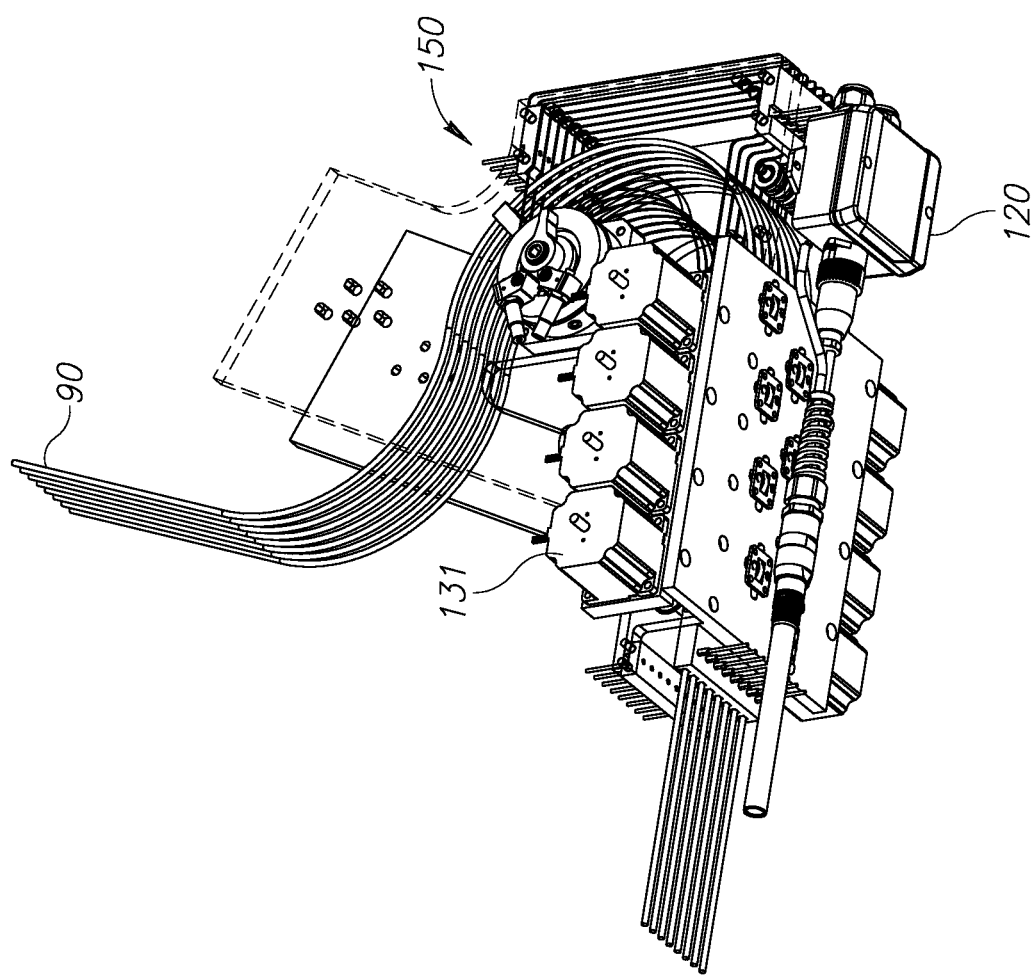
Figure 6F:
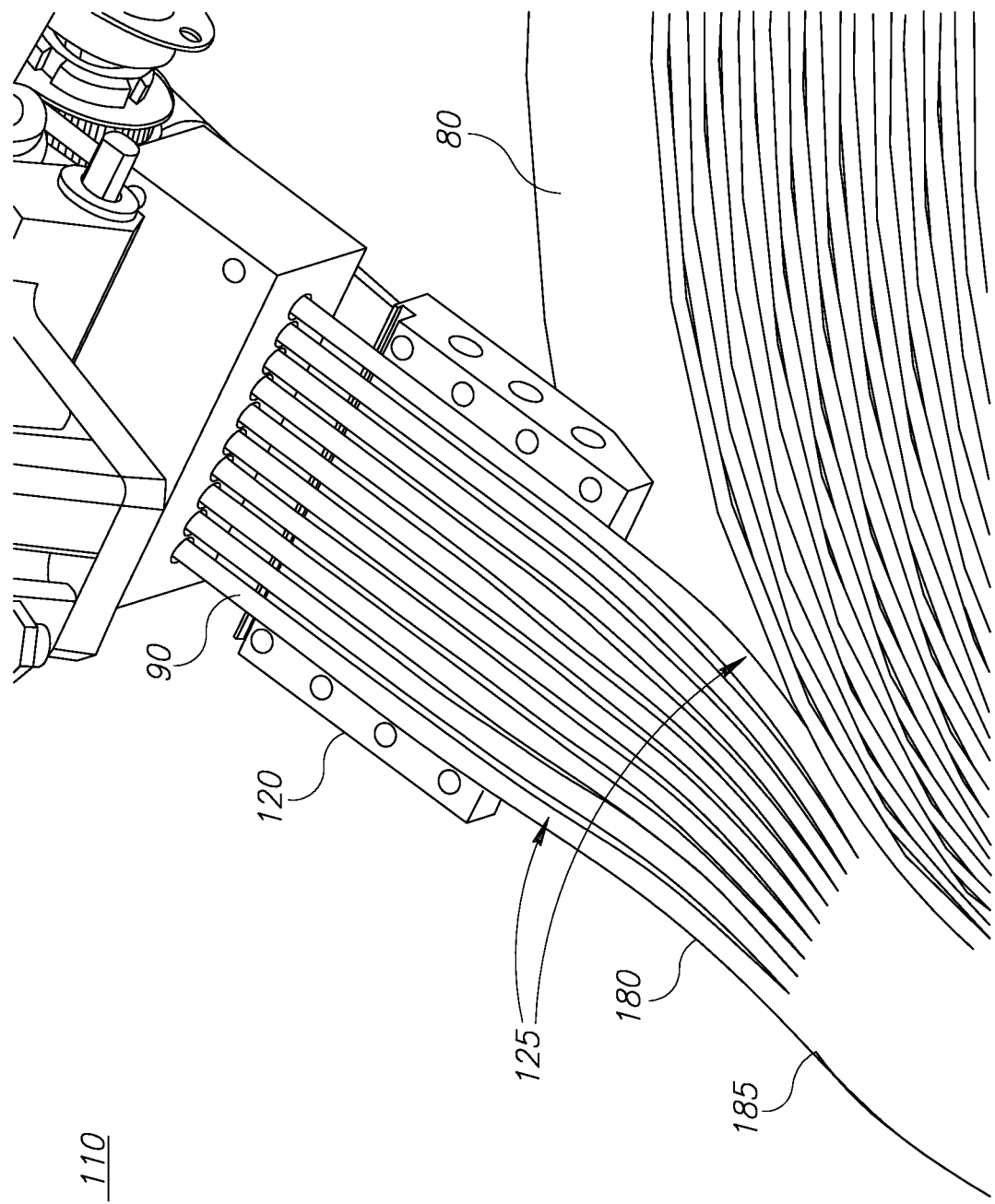

FIGS. 6D and 6E are perspective bottom view and perspective top view, respectively, of feeder 150, strand timing module 151 and tip 110, according to some embodiments of the invention. Heater unit 120 is illustrated at the bottom of the device and may be configured to heat substrate 80, e.g. by hot air convection, and possibly also strands 90. FIG. 6F schematically illustrates tip 110 with heating element 120 configured to liquefy the strand surfaces and optionally liquefy the surface of substrate 80 to provide attachment and monolithic re-solidification of strands 90 to substrate 80. Strand and substrate heating may be carried out by a single heating element 120 or by multiple heating elements 120.

Figure 7A:
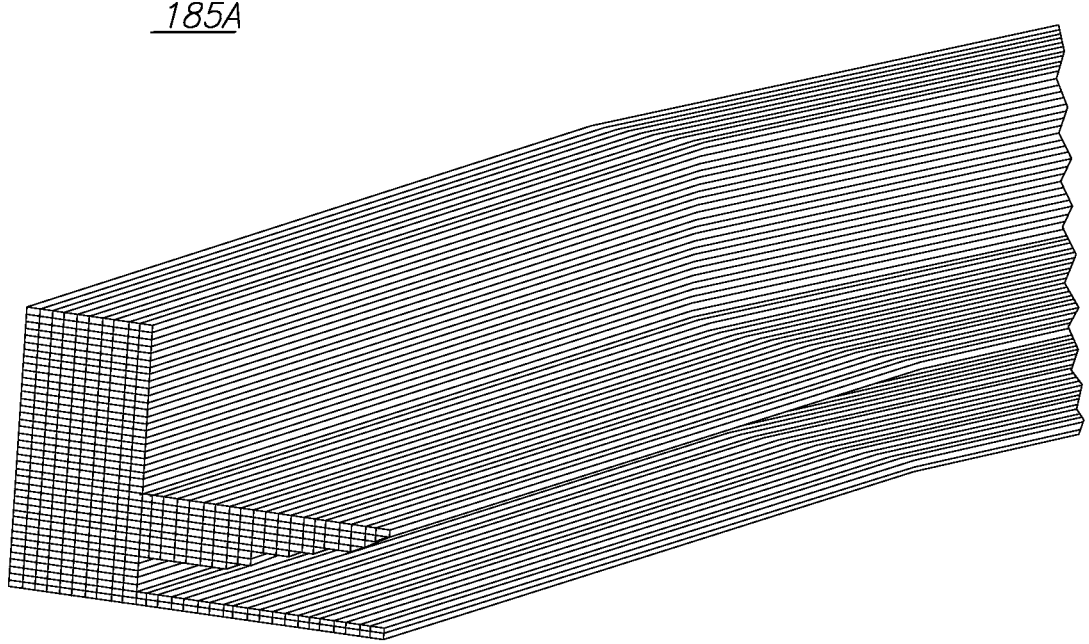
FIGS. 7A-7F are high level schematic configurations of attached strands at various spatial configurations, according to some embodiments of the invention.
Figure 7B:
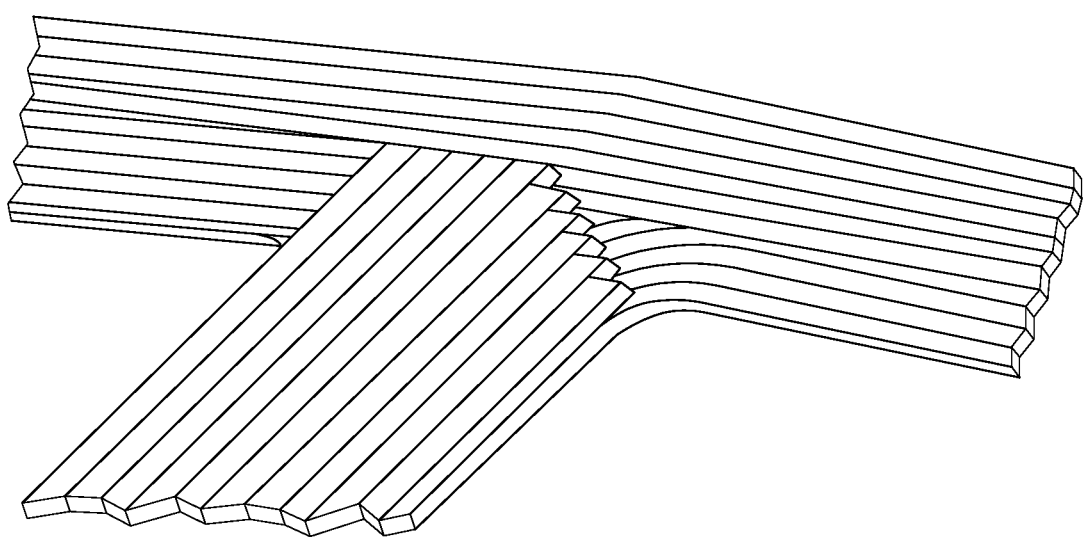
Figure 7C:
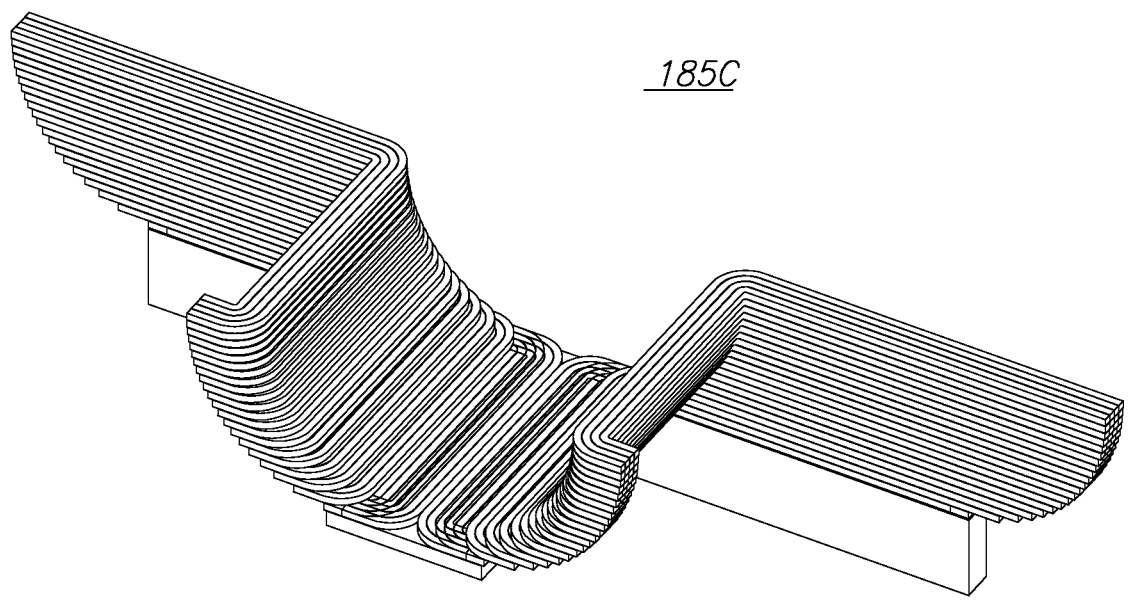
Figure 7D:
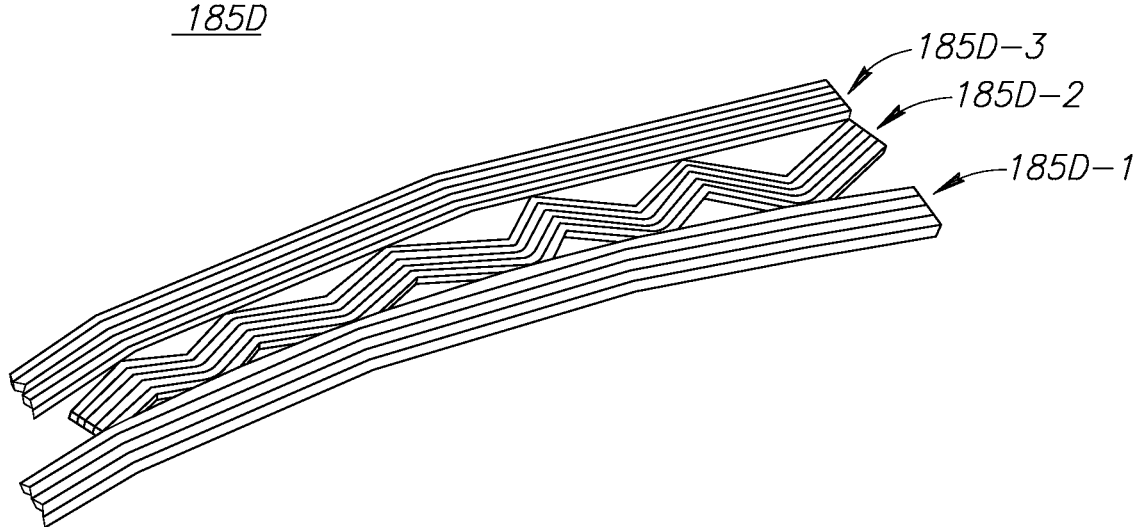
Figure 7F:
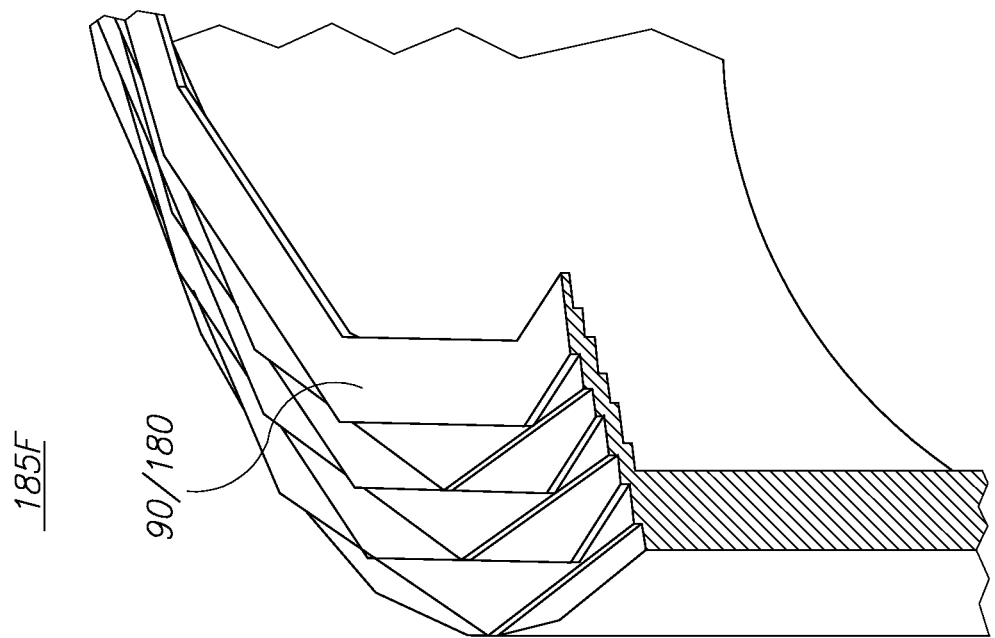
Figure 7E:
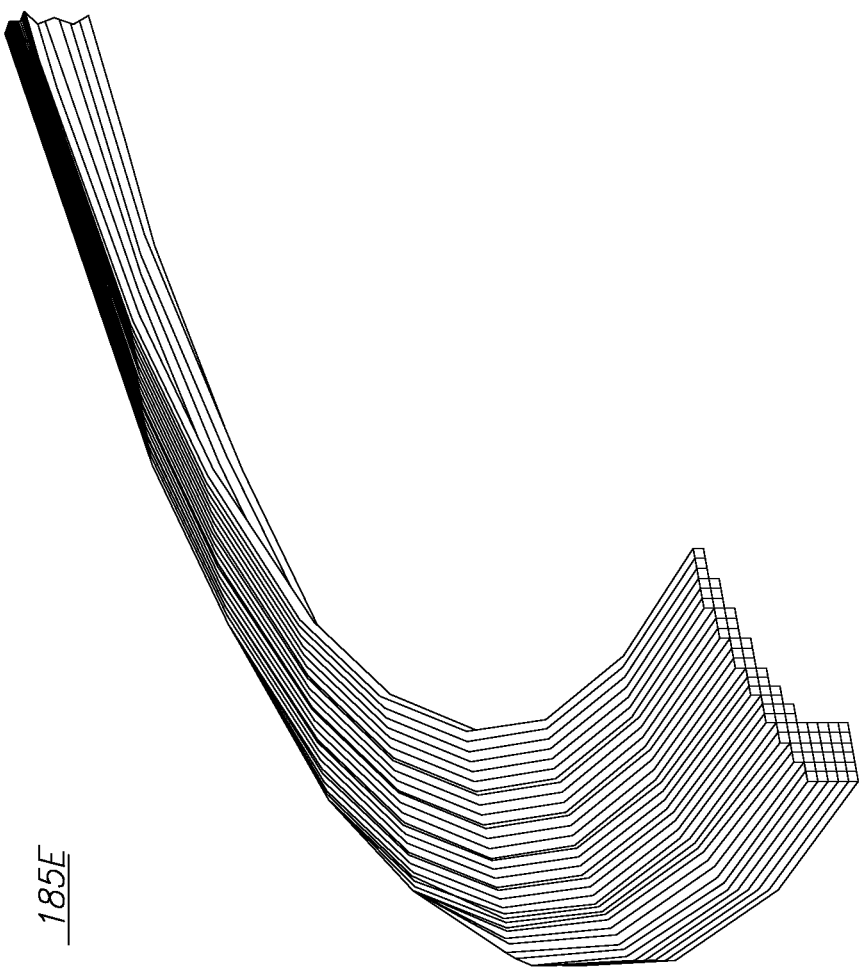

FIGS. 7A-7F are high level schematic configurations of attached strands at various spatial configurations 185A-F, according to some embodiments of the invention. Individual strands are illustrated as being separate for clarity of the explanation, although they are monolithically attached in the actual manufactured product or part. Any of the spatial configurations may comprise multiple steps of additive manufacturing of strands. FIG. 7A schematically illustrates a spatial configuration 185A of strands 90 that yields a hanging, bench-like structure. Strands may be added in sequential addition steps utilizing a varying number of strands attached to each other prior to deposition, to provide strength in the horizontal direction. FIG. 7B schematically illustrates a spatial configuration 185B of strands 90 that yields a flange having adjustable fine scale characteristics that are determined according to the specific strand feeding configuration. FIG. 7C schematically illustrates a spatial configuration 185C of strands 90 that yields a complex structure that is nevertheless monolithically attached and has uniform mechanical properties across the structure. The disclosed system 100 and method 300 provide the capability to modify and monitor a highly versatile spatial strand configuration to yield many complex structures. FIG. 7D schematically illustrates a spatial configuration 185D of strands 90 that yields a partially hollow intermediate layer (185D-2, having zigzag-attached strands) between an inner and an outer continuous layers, 185D-1 and, respectively. Spatial configuration 185D may be used e.g., to reduce the weight of a produced cylindrical part (see FIG. 2) by intermediate layer 185D-2, while providing required properties of the inner and outer surfaces thereof. FIG. 7E schematically illustrates a spatial configuration 185E of strands 90 that yields an overhang that provide a dome-like structure without requiring any supports as in traditional 3D printing. The mechanical strength results from strands 90 attached to each other prior to their deposition. FIG. 7F schematically illustrates a spatial configuration 185F of flattened strands 90/180 that yields an overhang that provides a dome-like structure. Flattened strands 180 may be produced from attached thin strands or may be received in broad strand form as fed material 91.

Figure 11:
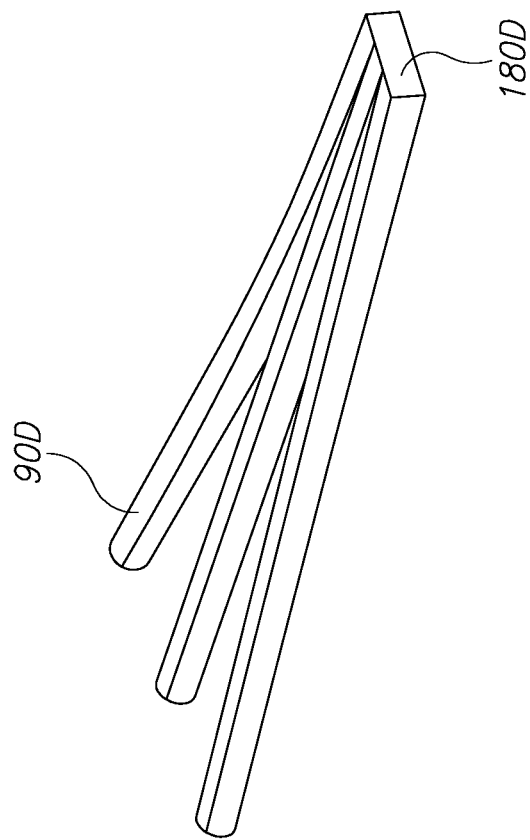
Figure 10A:
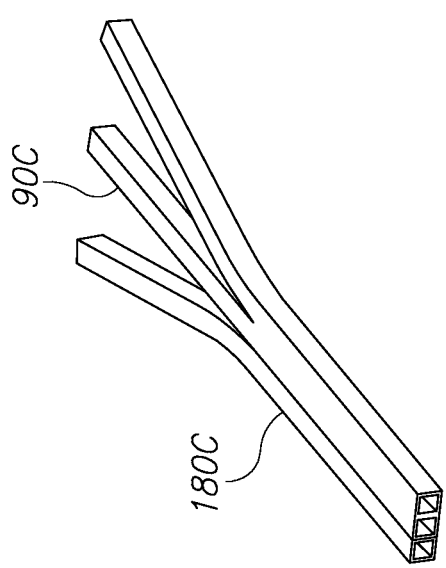
Figure 10B:
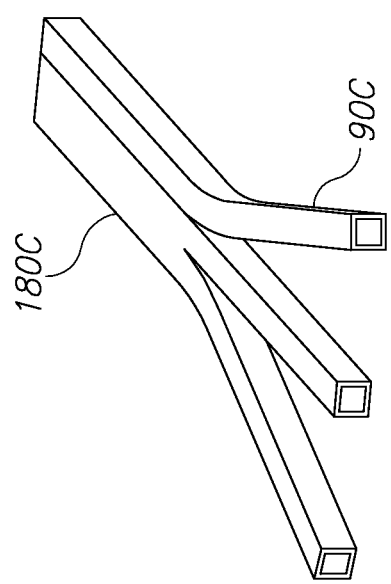

FIGS. 8A-11 are high level schematic illustrations of various types of strands 90 and their attachment, according to some embodiments of the invention. FIGS. 8A and 8B schematically illustrate strands 90A having a complex H-like profile which complement each other upon attaching strands 90A into stripe 180A, the respective protrusions and recesses in the profile supporting the attachment by surface liquefaction. FIGS. 9A and 9B schematically illustrate strands 90B having hexagonal profiles (that may be solid or hollow), which complement lower and upper deposited strands 90B upon attachment into stripe 180B and onto substrate 80 (not shown). FIGS. 10A and 10B schematically illustrate strands 90C having hollow profiles (the outer periphery of the hollow is maintained solid during attachment of strands 90C) providing stripe 180C with hollows that reduce their weight and may enable insertion of wires into the hollows. FIG. 11 schematically illustrates strands 90D having round profiles which are attached to form stripe 180D having a rectangular profile, achieved by the surface melting of strands 90D, possibly under application of some lateral pressure or guidance. The cores of strands 90D are maintained solid during the attachment process to avoid thermal deformation.

Elements from FIGS. 1A and 1B as well as from FIGS. 2-11 may be combined in any operable combination, and the illustration of certain elements in certain figures and not in others merely serves an explanatory purpose and is non-limiting.

Figure 12:
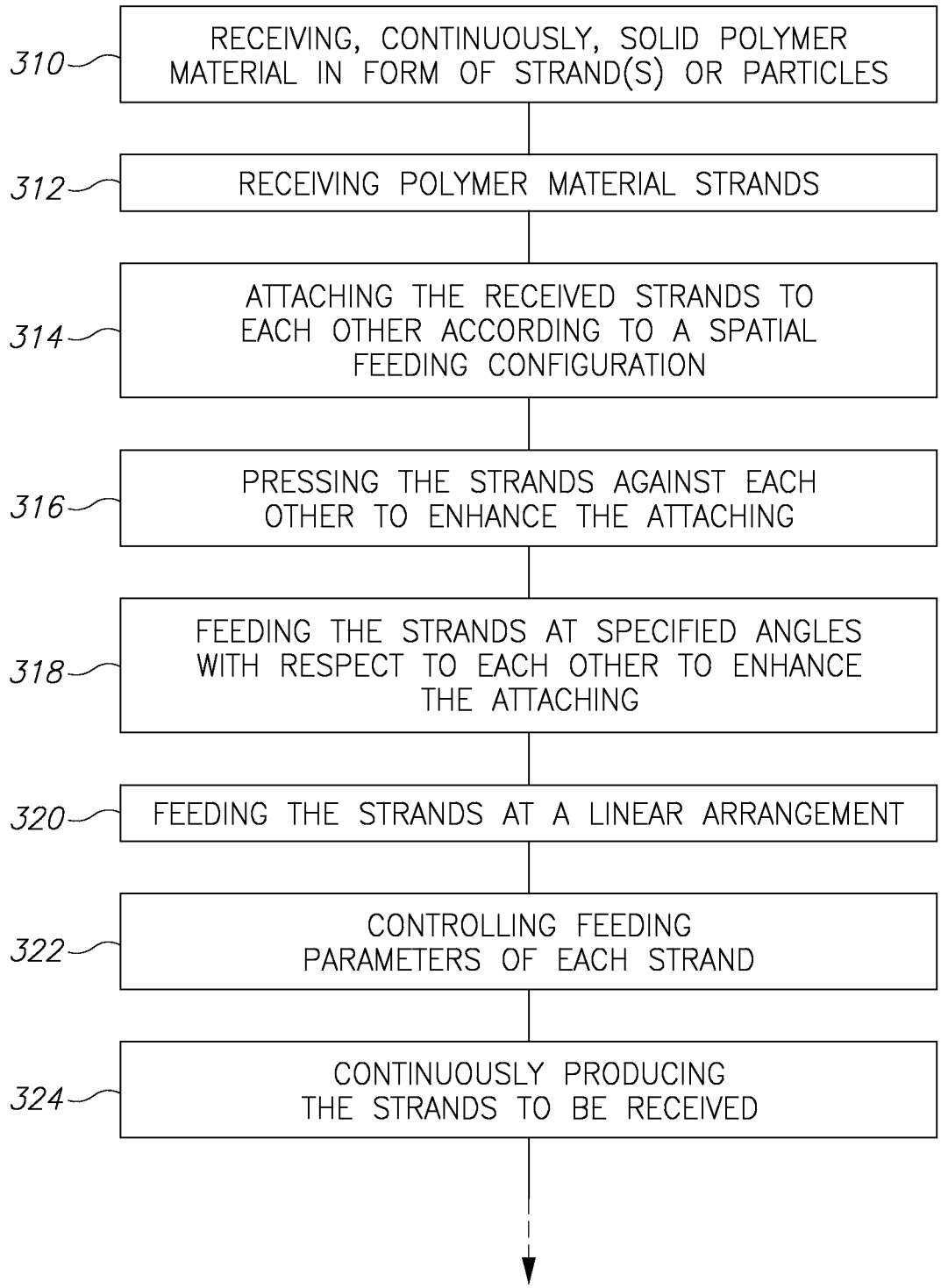
FIG. 12 is a high level flowchart illustrating a method of additive manufacturing, according to some embodiments of the invention.

FIG. 12 is a high level flowchart illustrating a method 300 of additive manufacturing, according to some embodiments of the invention. The method stages may be carried out with respect to system 100 described above, which may optionally be configured to implement method 300. Method 300 may be partially implemented, with respect to the control processes, by at least one computer processor. Certain embodiments comprise computer program products comprising a computer readable storage medium having computer readable program embodied therewith and configured to carry out of the relevant stages of method 300.

Method 300 comprises receiving, continuously, solid polymer material in form of at least one strand or a plurality of particles (stage 310), heating a surface of the continuously received solid polymer material peripherally to liquefy the surface, using specified heating-related parameters which are selected to maintain a central volume of the continuously received solid polymer material in a solid state (stage 340), optionally selecting heating-related parameters to maintain the center solid (stage 342). Method 300 further comprises liquefying a surface of a polymer substrate (stage 350), maintaining the bulk of the substrate solid (stage 352), and attaching the peripherally heated surface of the continuously received solid polymer material to the liquefied surface of the polymer substrate, wherein the attachment to the polymer substrate is achieved by a re-solidification of the liquefied surface to yield monolithic attachment (stage 360). Substrate comprising a structure that was previously produced by method 300 may be used (stage 354). Receiving 310 may comprise receiving continuously, a plurality of solid material strands (stage 312) and attaching 360 may comprise attaching the plurality of strands to each other, according to a spatial feeding configuration (stage 314), such as a linear arrangement of the strands next to each other (stage 320). Method 300 may further comprise pressing the strands against each other to enhance the attaching (stage 316). Method 300 may further comprise feeding the strands at specified angles with respect to each other to enhance the attaching (stage 318). Method 300 may further comprise controlling feeding parameters of each strand to be received (stage 322) to control the form of the manufactured product and to control the heating period of the strands. Alternatively or complementarily, attaching 360 may comprise attaching the strands to each other and, simultaneously, attaching the strands to the substrate (stage 366). Alternatively or complementarily, method 300 may comprise using polymer particles as the solid polymer material (stage 330).

Method 300 may further comprise continuously producing the strands to be received (stage 324), e.g., by extrusion. Method 300 may further comprise adjusting a cross section of the produced strands according to specified attachment and structural requirements (stage 326) and possibly using hollow strand(s), strands of different solid materials, reinforced strand(s) and strand(s) with additive(s) (stage 328).

Method 300 may further comprise carrying out attaching 360 with respect to the substrate according to a specified product design (stage 362). In certain embodiments, method 300 may further comprise pressing the peripherally heated surface of the continuously received solid material against the liquefied surface of the substrate (stage 364).

Method 300 may further comprise optimizing the specified heating-related parameters such as the choice of heat source, adjustment of the heating temperature, the heating duration and the feeding velocity of the solid material (stage 344) and optionally modifying the specified heating-related parameters to determine and control a depth of surface liquefaction with respect to a geometry of the substrate, while maintaining the central volume in a solid state (stage 346). Method 300 may further comprise continuously controlling a manufacturing process according to method 300 and/or monitoring the attaching in closed loop to control a quality of a manufactured product (stage 372) and optionally modifying the specified heating-related parameters on-the-fly according to the monitored attachment, manufacturing process and controlled quality (stage 374). Method 300 may further comprise modifying the attaching location (e.g., according to the closed-loop monitoring) to compensate for geometry deviation from a desired parameter such as position, volume, tolerance etc. (stage 376).

Figure 13A:
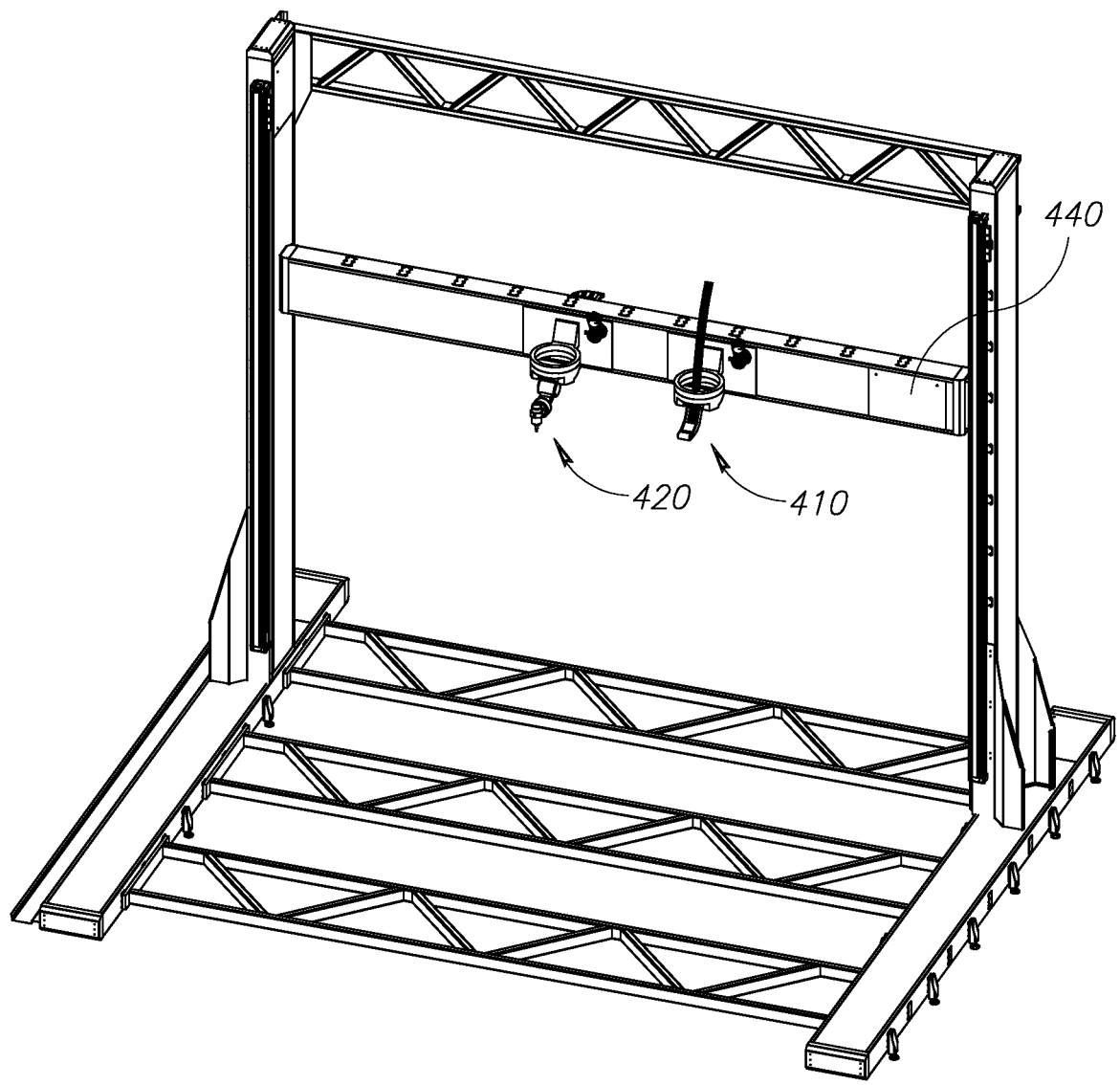
FIGS. 13A is a high level schematic illustration of an additive manufacturing system comprising a printing head and a routing head, according to some embodiments of the invention.

FIGS. 13A is a high level schematic illustration of an additive manufacturing system 400 comprising a printing head 410 and a routing head 420, according to some embodiments of the invention.

System 400 may comprise a printing head 410 and a routing head 420 coupled to a positioning unit 440. In various embodiments, positioning unit 440 is identical to positioning units 130 as described above with respect to FIGS. 1-6.

Figure 13B:
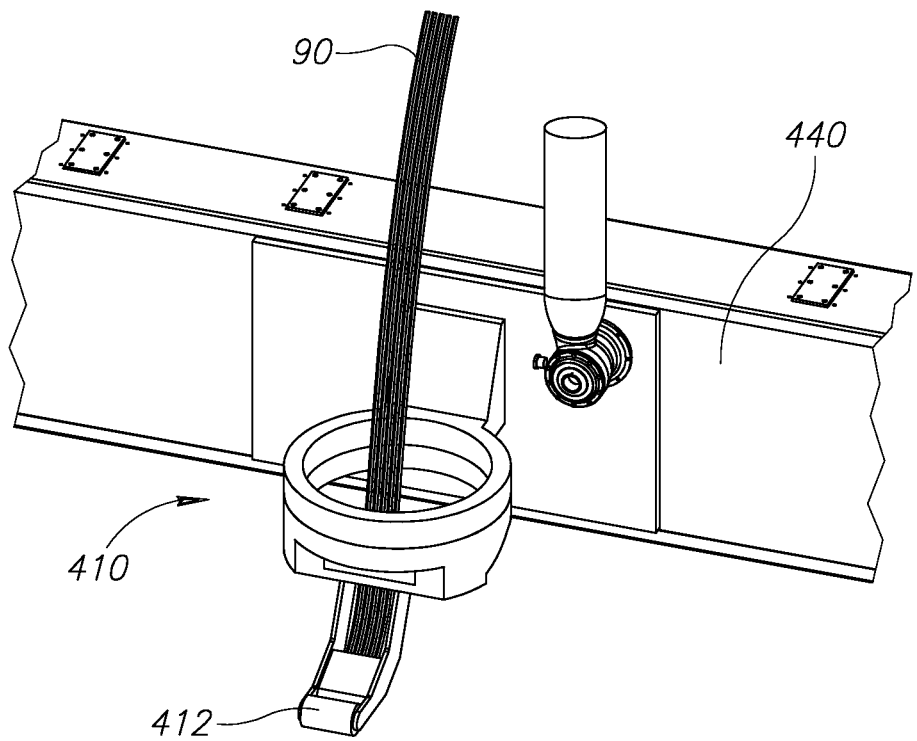
FIG. 13B is a high level schematic illustration of a printing head of an additive manufacturing system, according to some embodiments of the invention.

FIG. 13B is a high level schematic illustration of a printing head 410 of an additive manufacturing system 400, according to some embodiments of the invention.

Printing head 410 may be configured to perform polymer additive manufacturing (e.g., as described above with respect to FIGS. 1-13). Printing head 410 may comprise a tip 412 that may be identical to tips 110 as described above with respect to FIGS. 2-6. Printing head 410 may comprise feeder(s), heating element(s), cutting unit(s) and/or attachment unit(s) that may be identical to feeder(s) 150, heating element(s) 120, cutting unit(s) 170 and attachment unit(s) 135, respectively, as described above with respect to FIGS. 2-6.

Figure 13C:
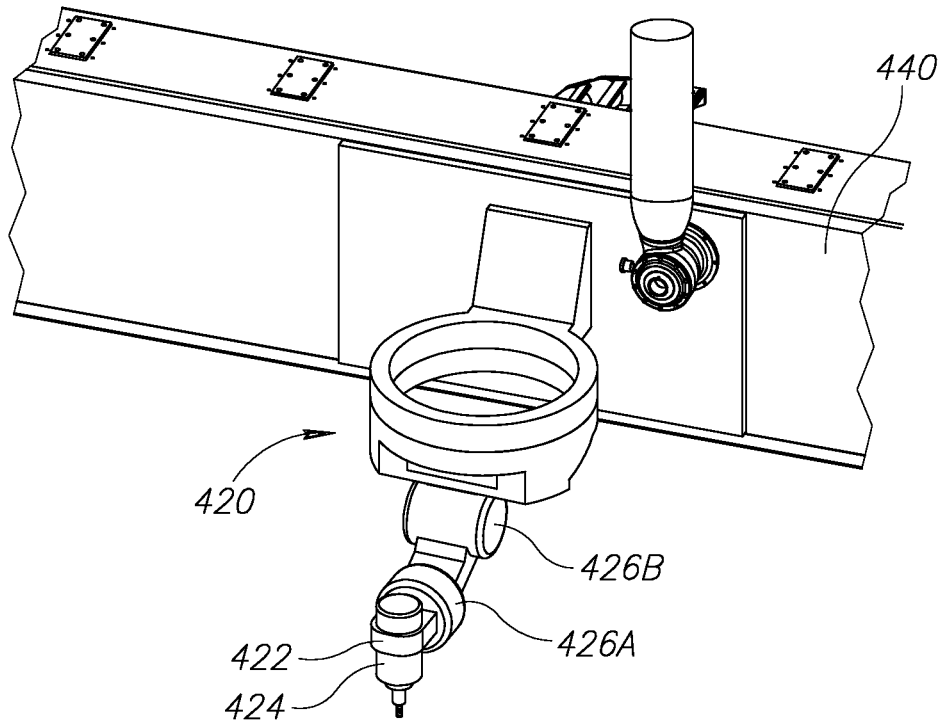
FIG. 13C is a high level schematic illustration of a routing head of an additive manufacturing system, according to some embodiments of the invention.

FIG. 13C is a high level schematic illustration of a routing head 420 of an additive manufacturing system 400, according to some embodiments of the invention.

Routing head 420 may be configured to perform on-line processing (e.g., drilling, routing, etc.) of the material (e.g., strands 90 and/or stripes 180, as described above with respect to FIGS. 1-11). In various embodiments, routing head 420 is configured to operate simultaneously and/or in a sequence with operation printing head 410. Routing head 420 may comprise a holder 422 configured to receive and hold a processing tool 424. In various embodiments, processing tool 424 comprises a spindle, a drill head, a tapping head, a knife head and/or an ironing head.

Routing head 420 may comprise rotary axes 426 (e.g., hinges), for example, a first rotary axis 426a and/or a second rotary axis 426b. Rotary axes 426 may be configured to enable orientation and/or positioning of processing tool 424 at a predetermined orientation and/or position with respect to processes material (e.g., strands 90 and/or stripes 180). In some embodiments, a robotic unit (not shown) may be used to position and/or orient processing tool 424.

Figure 13D:
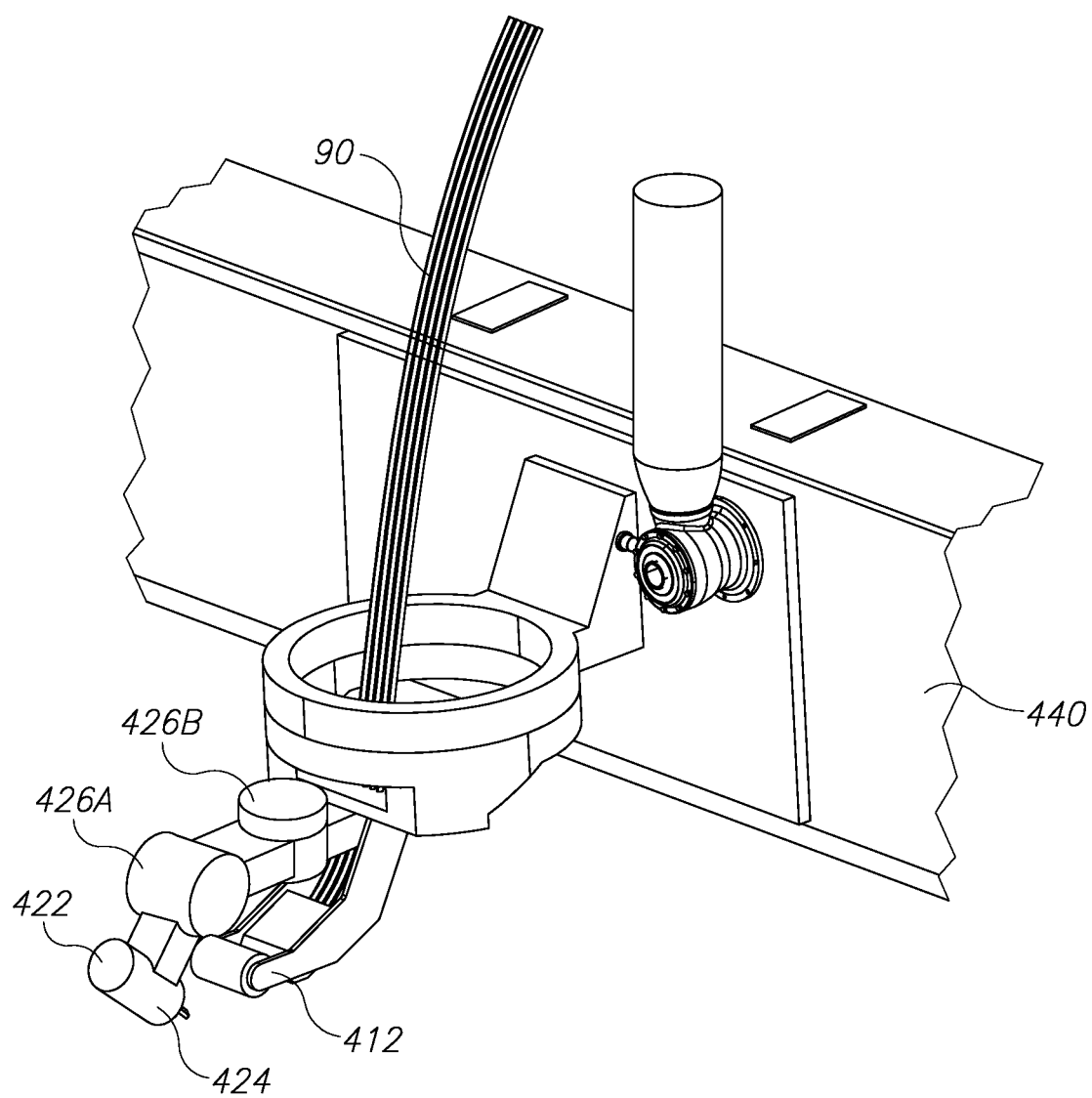
FIG. 13D is a high level schematic illustration of a hybrid head of an additive manufacturing system, according to some embodiments of the invention.

FIG. 13D is a high level schematic illustration of a hybrid head 430 of an additive manufacturing system 400, according to some embodiments of the invention.

Hybrid head 430 may comprise printing head 410 that may comprise, for example tip 412, feeder(s), heating element(s), cutting unit(s) and/or attachment unit(s) (e.g., as described above with respect to FIG. 13B) and routing head 420 that may comprise, for example, holder 422, processing tool 424 and/or rotary axes 426 (e.g., as described above with respect to FIG. 13C).

In various embodiments, printing head 410 and/or routing head 420 are detachably coupled to hybrid head 430. For example, at least one of printing head 410 and/or routing head 420 may be detached from hybrid head 430. In various embodiments, orientation and/or position of processing tool 424 (e.g., spindle) of routing head 420 is adjusted with respect to printing head 410 using, for example, rotary axes (e.g., hinges) 426.

Referring back to FIGS. 13A-13D, printing head 410 and routing head 420 may be configured to operate in a sequence with respect to each other. In some embodiments, printing (e.g., addition of material by tip 412 of printing head 410) is performed prior to processing (e.g., routing) of the material. In some embodiments, processing of the material (e.g., routing) by routing head 420 is performed prior to printing (e.g., addition of material) by printing head 410 to, for example, prepare the material for printing.

In various embodiments, printing head 410 and routing head 420 may be configured to operate simultaneously to, for example, complement and/or correct each other. For example, routing head 420 may remove access material while printing head 420 may add material to cover milled areas. In another example, printing head 410 may attach additional layers that may obstruct access to desired areas of substrate 80, while routing head 420 may drill and/or route substrate 80 to enable the access to the desired areas.

In various embodiments, printing head 410 and routing head 420 are mounted on same and/or separate motion axes. In various embodiments, printing head 410 is mounted on a first positioning unit (e.g., positioning unit 440) and routing head 420 is mounted on a second positioning unit (e.g., positioning unit 440), where the first and the second positioning units may be configured to operate simultaneously and/or in a sequence with respect to each other.

Aspects of the present invention are described above with reference to flowchart illustrations and/or portion diagrams of methods, apparatus (systems) and computer program products according to embodiments of the invention. It will be understood that each portion of the flowchart illustrations and/or portion diagrams, and combinations of portions in the flowchart illustrations and/or portion diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram portion or portions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions.

The aforementioned flowchart and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function(s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the invention. The various appearances of "one embodiment", "an embodiment", "certain embodiments" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment. Certain embodiments of the invention may include features from different embodiments disclosed above, and certain embodiments may incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A method of additive manufacturing, the method comprising consecutive steps of:
   (a) receiving, simultaneously and continuously, at least two solid polymer strands, (b) simultaneously liquefying at least a part of adjacent surfaces of said at least two solid polymer strands, wherein the liquefying is carried out using specified heating-related parameters which are selected to maintain a central volume of each strand of the at least two solid polymer strands in a solid state, thereby obtaining liquified surfaces,
(c) simultaneously attaching said liquified surfaces to yield attached strands;
(d) simultaneously pressing the at least two solid polymer strands against each other to ensure attachment; and
(e) simultaneously solidifying the liquefied surfaces to yield monolithic attachment.

2. The method of claim 1, further comprising feeding the at least two solid polymer strands at specified angles with respect to each other to enhance the attaching.

3. The method of claim 1, wherein the at least two solid polymer strands comprise at least one of: at least one hollow strand, strands of different solid materials, strands of different cross sections, at least one reinforced strand and at least one strand with an additive.

4. The method of claim 1, further comprising consecutive steps of: (f) simultaneously liquefying at least two additional strands and the attached strands; (g) simultaneously attaching and pressing the additional strands to the attached strands.

5. The method of claim 1, wherein the specified heating-related parameters comprise at least one of an energy source, a temperature, an energy application duration and a feeding velocity of the solid polymer and the method further comprises modifying the specified heating-related parameters to adjust a depth of surface liquefaction with respect to a geometry of the at least two solid polymer strands, while maintaining the central volume in a solid state.

6. The method of claim 1, further comprising monitoring the attaching in closed loop to control a quality of a manufactured product based on the specified heating-related parameters.

7. The method of claim 1, wherein the solid polymer comprises thermoplastic polymer.

\* \* \* \* \*